United States Patent
Pezeshki et al.

(10) Patent No.: US 11,659,589 B2
(45) Date of Patent: May 23, 2023

(54) UPLINK TRANSMISSION REPETITION BASED ON UPLINK PRIORITY

(71) Applicant: QUALCOMM Incorporated, San Diego, CA (US)

(72) Inventors: Hamed Pezeshki, San Diego, CA (US); Yan Zhou, San Diego, CA (US); Tao Luo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 166 days.

(21) Appl. No.: 17/158,928

(22) Filed: Jan. 26, 2021

(65) Prior Publication Data
US 2022/0240273 A1     Jul. 28, 2022

(51) Int. Cl.
| | |
|---|---|
| *H04W 72/02* | (2009.01) |
| *H04W 72/12* | (2023.01) |
| *H04L 5/00* | (2006.01) |
| *H04L 25/02* | (2006.01) |
| *H04W 72/1268* | (2023.01) |

(52) U.S. Cl.
CPC ....... *H04W 72/1242* (2013.01); *H04L 5/0048* (2013.01); *H04L 25/0226* (2013.01); *H04W 72/1268* (2013.01); *H04W 72/1284* (2013.01)

(58) Field of Classification Search
None
See application file for complete search history.

(56) References Cited

U.S. PATENT DOCUMENTS

| | | | | |
|---|---|---|---|---|
| 10,841,934 | B2* | 11/2020 | Zhou | H04W 72/1242 |
| 2019/0166607 | A1* | 5/2019 | Zhou | H04W 16/14 |
| 2019/0182824 | A1* | 6/2019 | Chatterjee | H04W 72/0413 |
| 2020/0404692 | A1* | 12/2020 | Yin | H04L 1/0031 |
| 2021/0037478 | A1* | 2/2021 | Yang | H04W 72/0493 |
| 2021/0120559 | A1* | 4/2021 | Li | H04W 72/0413 |
| 2021/0282137 | A1* | 9/2021 | Wang | H04W 72/0446 |

OTHER PUBLICATIONS

International Search Report and Written Opinion—PCT/US2022/012482—ISA/EPO—Apr. 7, 2022 (2101475WO).

(Continued)

*Primary Examiner* — Sai Aung
(74) *Attorney, Agent, or Firm* — Holland & Hart LLP

(57) ABSTRACT

Methods, systems, and devices for wireless communications are described. A user equipment (UE) may support repetitions of any uplink transmission as a function of, at least, uplink transmission priority. In some implementations, a base station may transmit to the UE a configuration or an indication of a configuration that maps different repetition values to different priority levels, among other factors. Subsequently, the base station may transmit a message to the UE scheduling or activating an uplink transmission for the UE to send. The UE may then transmit the uplink transmission according to a number of repetitions determined based on the received configuration and a priority level of the uplink transmission. In some implementations, the number of repetitions of each uplink transmission may be jointly determined with uplink priority and one or more other factors, such as UCI type, an SRS purpose, or any combination thereof.

30 Claims, 18 Drawing Sheets

(56) References Cited

OTHER PUBLICATIONS

Nokia, et al., "HARQ-ACK Feedback Enhancements for URLLC/IIoT", 3GPP Draft, 3GPP TSG RAN WG1 #103-e, R1-2008842, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26-Nov. 13, 2020, Oct. 23, 2020 (Oct. 23, 2020), XP051945381, 14 Pages, Retrieved from the Internet: URL: https://ftp.3gpp.org/tsg_ran/WG1_RL1/TSGR1_103-e/Docs/R1-2008842.zip R1-2008842_Nokia_Rel.-17_IIoT_HARQ_Enhancements.docx [Retrieved on Oct. 23, 2020] p. 6.

* cited by examiner

UPLINK TRANSMISSION REPETITION BASED ON UPLINK PRIORITY

TECHNICAL FIELD

The following relates to wireless communications, including uplink transmission repetition based on uplink priority.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a base station (or another network device) may transmit an indication to a UE to transmit an uplink transmission to the base station according to a number of repetitions. By transmitting the uplink transmission according to the number of repetitions, the UE may increase the reliability of a data transmission carried with the uplink transmission and thereby increase the likelihood of successfully decoding. Techniques are desired for a more enhanced repetition configuration for transmitting an uplink transmission.

SUMMARY

The described techniques relate to improved methods, systems, devices, and apparatuses that support uplink transmission repetition based on uplink priority. Generally, the described techniques relate to an indication of a repetition configuration that facilitates mapping different repetition values (different numbers of repetitions) for uplink transmissions to different priority levels. In some examples, the mappings are further based on one or more other factors. A user equipment (UE) may receive the indication of the repetition configuration and may determine a number of repetitions for a corresponding uplink transmission based at least on a priority level of the corresponding uplink transmission. In some examples, the UE may use the indication of the repetition configuration to reference to a repetition configuration separate from the indication, or the indication of the repetition configuration may be or may include the repetition configuration.

Based on the indication of the repetition configuration, a first uplink transmission may be associated with a first priority (for example, a relatively higher priority) that maps to a first number of repetitions, and a second uplink transmission may be associated with a second priority (for example, a relatively lower priority) that maps to a second number of repetitions that is lower than the first number of repetitions based on the first priority being higher than the second priority. The UE may then transmit the first uplink transmission, the second uplink transmission, or both according to determined respective numbers of repetitions. In some examples, the mapping between the priority levels and the repetition values may further be based on an uplink control information (UCI) type or a sounding reference signal (SRS) purpose (for example, if the uplink transmission is an SRS), among other examples, or any combination thereof.

One innovative aspect of the subject matter described in this disclosure can be implemented in a method for wireless communications at a UE. The method may include receiving, from a base station, an indication of a repetition configuration for one or more uplink transmission types, the repetition configuration including a mapping of respective repetition values of a set of multiple repetition values for the one or more uplink transmission types to at least respective priority levels of a set of multiple priority levels; receiving, from the base station, a message indicating an uplink transmission of the one or more uplink transmission types to transmit to the base station; and transmitting, to the base station in response to receiving the message, the uplink transmission according to a number of repetitions that is based on the indication of the repetition configuration and a priority level for the uplink transmission of the set of multiple priority levels.

Another innovative aspect of the subject matter described in this disclosure can be implemented in an apparatus for wireless communications at a UE. The apparatus may include a processor, memory in electronic communication with the processor, and instructions stored in the memory. The instructions may be executable by the processor to cause the apparatus to receive, from a base station, an indication of a repetition configuration for one or more uplink transmission types, the repetition configuration including a mapping of respective repetition values of a set of multiple repetition values for the one or more uplink transmission types to at least respective priority levels of a set of multiple priority levels; to receive, from the base station, a message indicating an uplink transmission of the one or more uplink transmission types to transmit to the base station; and to transmit, to the base station in response to receiving the message, the uplink transmission according to a number of repetitions that is based on the indication of the repetition configuration and a priority level for the uplink transmission of the set of multiple priority levels.

Another innovative aspect of the subject matter described in this disclosure can be implemented in another apparatus for wireless communications at a UE. The apparatus may include means for receiving, from a base station, an indication of a repetition configuration for one or more uplink transmission types, the repetition configuration including a mapping of respective repetition values of a set of multiple repetition values for the one or more uplink transmission types to at least respective priority levels of a set of multiple priority levels; means for receiving, from the base station, a message indicating an uplink transmission of the one or more uplink transmission types to transmit to the base station; and means for transmitting, to the base station in response to receiving the message, the uplink transmission according to a number of repetitions that is based on the indication of the repetition configuration and a priority level for the uplink transmission of the set of multiple priority levels.

Another innovative aspect of the subject matter described in this disclosure can be implemented in a non-transitory computer-readable medium storing code for wireless communications at a UE. The code may include instructions executable by a processor to receive, from a base station, an indication of a repetition configuration for one or more uplink transmission types, the repetition configuration including a mapping of respective repetition values of a set of multiple repetition values for the one or more uplink transmission types to at least respective priority levels of a set of multiple priority levels; to receive, from the base station, a message indicating an uplink transmission of the one or more uplink transmission types to transmit to the base station; and to transmit, to the base station in response to receiving the message, the uplink transmission according to a number of repetitions that is based on the indication of the repetition configuration and a priority level for the uplink transmission of the set of multiple priority levels.

Another innovative aspect of the subject matter described in this disclosure can be implemented in a method for wireless communications at a base station. The method may include transmitting, to a UE, an indication of a repetition configuration for one or more uplink transmission types, the repetition configuration including a mapping of respective repetition values of a set of multiple repetition values for the one or more uplink transmission types to at least respective priority levels of a set of multiple priority levels; transmitting, to the UE, a message indicating an uplink transmission of the one or more uplink transmission types for the UE to transmit to the base station; and receiving, from the UE in response to transmitting the message, the uplink transmission according to a number of repetitions that is based on the indication of the repetition configuration and a priority level for the uplink transmission of the set of multiple priority levels.

Another innovative aspect of the subject matter described in this disclosure can be implemented in an apparatus for wireless communications at a base station. The apparatus may include a processor, memory in electronic communication with the processor, and instructions stored in the memory. The instructions may be executable by the processor to cause the apparatus to transmit, to a UE, an indication of a repetition configuration for one or more uplink transmission types, the repetition configuration including a mapping of respective repetition values of a set of multiple repetition values for the one or more uplink transmission types to at least respective priority levels of a set of multiple priority levels; to transmit, to the UE, a message indicating an uplink transmission of the one or more uplink transmission types for the UE to transmit to the base station; and to receive, from the UE in response to transmitting the message, the uplink transmission according to a number of repetitions that is based on the indication of the repetition configuration and a priority level for the uplink transmission of the set of multiple priority levels.

Another innovative aspect of the subject matter described in this disclosure can be implemented in another apparatus for wireless communications at a base station. The apparatus may include means for transmitting, to a UE, an indication of a repetition configuration for one or more uplink transmission types, the repetition configuration including a mapping of respective repetition values of a set of multiple repetition values for the one or more uplink transmission types to at least respective priority levels of a set of multiple priority levels; means for transmitting, to the UE, a message indicating an uplink transmission of the one or more uplink transmission types for the UE to transmit to the base station; and means for receiving, from the UE in response to transmitting the message, the uplink transmission according to a number of repetitions that is based on the indication of the repetition configuration and a priority level for the uplink transmission of the set of multiple priority levels.

Another innovative aspect of the subject matter described in this disclosure can be implemented in a non-transitory computer-readable medium storing code for wireless communications at a base station. The code may include instructions executable by a processor to transmit, to a UE, an indication of a repetition configuration for one or more uplink transmission types, the repetition configuration including a mapping of respective repetition values of a set of multiple repetition values for the one or more uplink transmission types to at least respective priority levels of a set of multiple priority levels; to transmit, to the UE, a message indicating an uplink transmission of the one or more uplink transmission types for the UE to transmit to the base station; and to receive, from the UE in response to transmitting the message, the uplink transmission according to a number of repetitions that is based on the indication of the repetition configuration and a priority level for the uplink transmission of the set of multiple priority levels.

DETAILED DESCRIPTION

Figure 1:
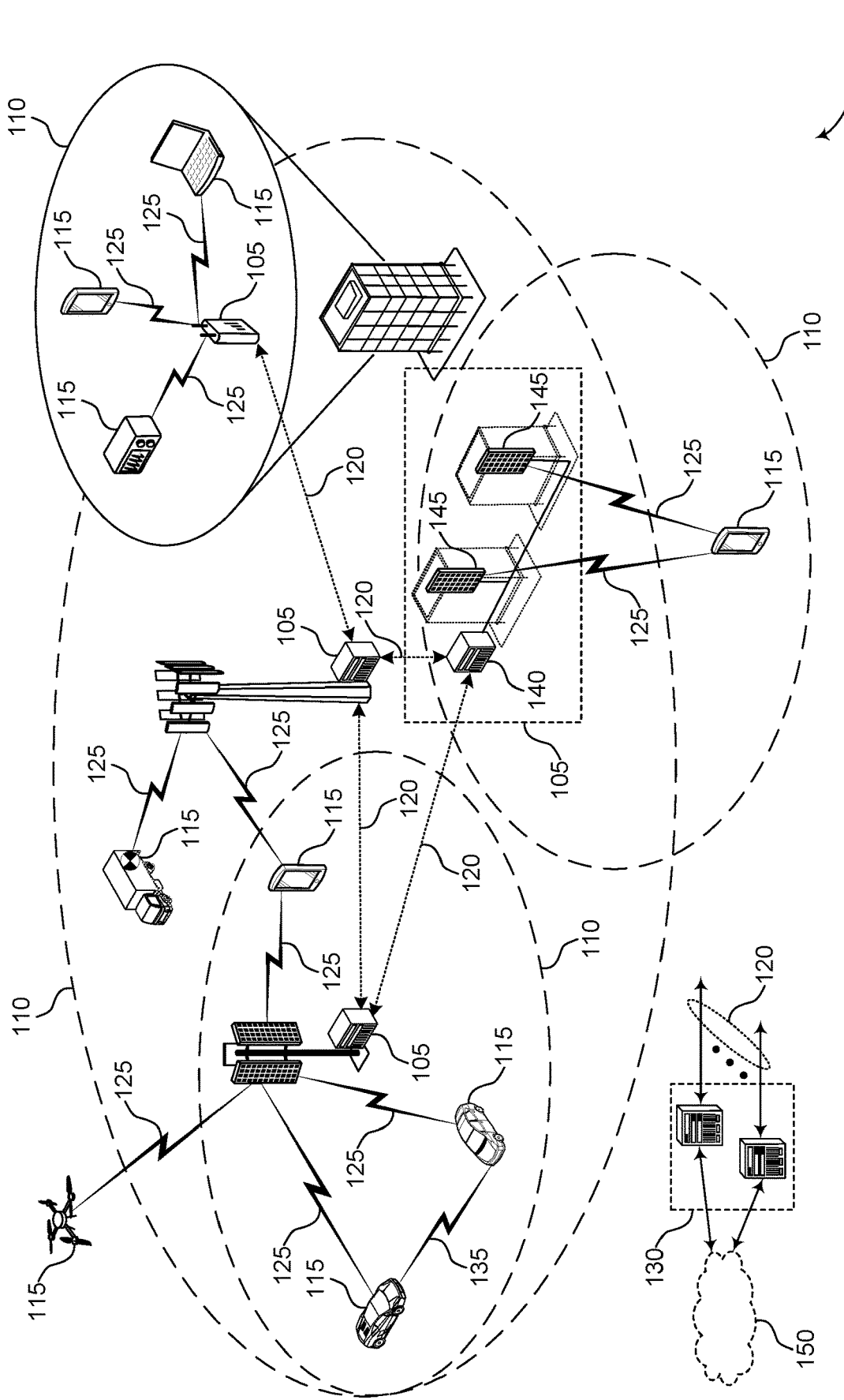
FIG. 1 illustrates an example of a wireless communications system that supports uplink transmission repetition based on uplink priority in accordance with aspects of the present disclosure.

In some wireless communications systems, multiple services may be supported that require different reliability and latency quality of service (QoS) constraints, and which may be associated with different priorities. For example, enhanced mobile broadband (eMBB) services may include a first set of reliability and latency requirements to be adhered to by devices using the eMBB services and may have a first relatively lower priority. Additionally or alternatively, ultra-reliable low latency communications (URLLC) services may include a second set of requirements with higher reliability and lower latency than the eMBB services, and the URLLC services may have a second relatively higher priority than the eMBB services. In some examples, the eMBB services may support data-driven use cases including high data rates across a wide coverage area, in which the data-driven use cases are associated with different constraints (for example, capacity constraints, connectivity constraints, mobility constraints) to support different coverage situations. As such, the eMBB services may be used to provide communications in a vast array of scenarios and may or may not include reliability or latency constraints depending on a given use case. Alternatively, the URLLC services may include an error rate (for example, a block error rate (BLER)) of no more than $10^{-5}$ to $10^{-4}$ (for example, high reliability constraints) within a 1 millisecond end-to-end latency bound (for example, low latency constraints). The URLLC services may be used for mission critical communications, such as remote surgery, autonomous vehicles, or additional situations in which high reliability and low latency are desired.

To support high reliability constraints (for example, for URLLC), scheduling devices (for example, network devices such as base stations) may configure devices to send transmissions multiple times to increase a probability that contents of the transmissions (for example, data, control information, or other types of information included in the transmissions) are successfully received and decoded at an intended device. For example, a transmitting device may repeat a transmission a number of times (for example, a number of repetitions), such that a device receiving the transmitted data may combine the different repetitions to successfully receive the transmitted data. In some examples, a base station may transmit downlink messages to a user equipment (UE) according to a number of repetitions to increase a likelihood that the UE can successfully receive and decode the downlink messages. Additionally or alternatively, the base station may schedule the UE to transmit an uplink message according to a number of repetitions to increase a likelihood that the base station can successfully receive and decode the uplink message, thereby increasing reliability that the uplink message is successfully communicated to the base station.

In some examples, a scheduling device or a transmitting device may determine an uplink repetition configuration based on an uplink control information (UCI) type. For some examples, it may be desirable to have uplink repetitions for an uplink channel carrying a first type of UCI (for example, hybrid automatic repeat request (HARQ) acknowledgment feedback), but not necessarily to have uplink repetitions, or fewer repetitions, for an uplink channel carrying a second type of UCI (for example, channel state information (CSI)). However, determining or assigning uplink repetitions merely as a function of UCI type using such techniques may be deficient because assigning uplink repetitions based on UCI type fails to assign uplink repetitions for other different and various types of uplink transmissions that may be implemented.

Various aspects of the present disclosure generally relate to determining a number of repetitions for any uplink transmission (for example, not limited to UCI or physical uplink control channel (PUCCH) transmissions), and more specifically, to determining a repetition value as a function of, at least, an uplink transmission priority. For example, uplink transmissions with relatively higher priorities can be configured with higher numbers of repetitions. In some implementations, a base station may transmit to a UE (for example, via radio resource control (RRC) signaling) an indication of a configuration (or the configuration itself) that maps one or more different repetition values to one or more different priority levels (for example, X repetitions for lower priority uplink transmissions, Y repetitions for higher priority uplink transmissions, or additional numbers of repetitions for other priority levels of uplink transmissions), among other factors.

In some examples, the base station may transmit a message to the UE scheduling or activating an uplink transmission. In some examples, the message may indicate a priority level for the uplink transmission. Additionally or alternatively, the UE may be preconfigured or dynamically configured with different priority levels for different uplink transmission types enabling the UE to determine the priority level associated with the uplink transmission. The UE may transmit the uplink transmission according to a number of repetitions determined based on the received indication of the configuration and the priority level associated with the uplink transmission. In some implementations, the UE may jointly determine the number of repetitions of with which to transmit an uplink transmission based on the priority level and one or more other factors, such as UCI type or a sounding reference signal (SRS) purpose, among other examples, or any combination thereof.

Particular aspects of the subject matter described in this disclosure may be implemented to realize one or more of the following potential advantages. The techniques employed by the described communication devices may provide benefits and enhancements such as implicitly indicating a number of repetitions for a UE to use to transmit an uplink transmission based on a priority of the uplink transmission to increase a reliability of the uplink transmission. Operations performed by the described communication devices may provide more efficient resource usage by mapping different numbers of repetitions of uplink transmissions to different priority levels, such that lower priority uplink transmissions may be repeated fewer times to reduce signaling overhead and resource usage, and such that higher priority uplink transmissions may be repeated more times to provide a greater likelihood of successfully reception and decoding.

Aspects of the disclosure are initially described in the context of wireless communications systems. Additionally, aspects of the disclosure are illustrated by an additional wireless communications system and a process flow. Aspects of the disclosure are further illustrated by and described with reference to apparatus diagrams, system diagrams, and flowcharts that relate to uplink transmission repetition based on uplink priority.

FIG. 1 illustrates an example of a wireless communications system 100 that supports uplink transmission repetition based on uplink priority in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in which a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), eMBB) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode if not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support URLLC or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

In some wireless communications systems, multiple services may be supported that include different reliability and latency qualities. For example, eMBB services may support a first set of reliability and latency standards, and URLLC services may support a second set of standards with higher reliability and lower latency than the eMBB services. To enable the URLLC services for supporting correct (for example, high reliability) and on-time (for example, low latency) communication of messages, the URLLC services may include a constraint associated with reliability (for example, a $10^{-5}$ BLER) and a constraint associated with latency (for example, 1 ms end-to-end latency). In some examples, communications associated with the URLLC services may have a higher priority than communications associated with the eMBB services based on the higher reliability and lower latency constraints for the URLLC services than for the eMBB services. For example, transmissions associated with the URLLC services may take precedence over other transmissions associated with the eMBB services to meet the associated reliability and latency constraints.

Additionally, to support high reliability constraints (for example, for URLLC), transmissions may be transmitted multiple times to increase a probability that the data in the transmissions is successfully received and decoded at an intended device. For example, a transmitted amount of data may be repeated a number of times (for example, a number of repetitions), such that a device receiving the transmitted data may combine the different repetitions to fully receive the transmitted data. In some examples, a base station 105 may transmit downlink messages to a UE 115 according to a number of repetitions to increase a likelihood that the UE 115 can fully receive and decode the downlink messages. Additionally or alternatively, the base station 105 may indicate for the UE 115 to transmit an uplink message according to a number of repetitions to increase a likelihood that the base station can fully receive and decode the uplink message (for example, higher reliability).

In some examples, sub-slot uplink repetitions (for example, PUCCH repetitions) may be supported (for example, repetitions of an uplink channel can be sent within a same slot), but other factors in uplink repetition frameworks may prevent the uplink repetitions from being used efficiently for URLLC services. For example, a PUCCH repetition may be enabled by a semi-static configuration. Additionally, the semi-static configuration for the PUCCH repetition (that is, a PUCCH repetition configuration) may be tied to a specific PUCCH format, and, once configured, this PUCCH repetition configuration may be applied to any PUCCH resource associated with that PUCCH format. Additionally, the PUCCH repetition configuration may be applicable to a subset of PUCCH formats (for example, "long" PUCCH formats, such as PUCCH formats 1, 3, and 4).

In some examples, it may be desirable to support a PUCCH repetition configuration that is more flexible and not constrained to a specific PUCCH format. For example, a number of bits for a first type of uplink transmission (for example, HARQ acknowledgment (ACK) bits) may vary depending on actual traffic, and a device (for example, UE 115) may determine which PUCCH format to use (for example, based on the number of bits for the uplink transmission). To increase the flexibility, a PUCCH repetition configuration may be indicated based on a UCI type. For example, for some cases, it may be desirable to have a PUCCH repetition for a PUCCH carrying HARQ-ACK (for example, a first UCI type) using a specific PUCCH format, but the PUCCH repetition may be inefficient for a PUCCH carrying channel state information (CSI) (for example, a second UCI type) although the PUCCH carrying the CSI uses the same PUCCH format as the PUCCH carrying the HARQ-ACK. Another example of such flexibility is that different numbers of repetitions may be indicated for different UCI types depending on use cases and coverage situations. Moreover, to support PUCCH repetition for sub-slot HARQ-ACK in which the configured sub-slot length is two (2) symbols, the PUCCH repetition may be applicable to additional PUCCH formats (for example, "short" PUCCH formats, such as PUCCH formats 0 and 2 are supported for the PUCCH repetition). However, determining or assigning uplink repetitions as a function of UCI type may also be deficient because it fails to assign uplink repetitions for other different and various types of uplink transmissions that exist (for example, aside from UCI).

Wireless communications system 100 may support enabling repetitions of any uplink transmission (for example, not limited to UCI or PUCCH transmissions) as a function of, at least, uplink transmission priority. For example, uplink transmissions with relatively higher priorities can be configured with higher numbers of repetitions. In some implementations, a base station 105 may transmit to a UE 115 (for example, via RRC signaling) a configuration or an indication of a configuration that maps different repetition values to different priority levels (for example, X repetitions for lower priority uplink transmissions, Y repetitions for higher priority uplink transmissions, or additional numbers of repetitions for other priority levels of uplink transmissions), among other factors. Subsequently, the base station may transmit a message to the UE scheduling or activating an uplink transmission for the UE to send. The UE may then transmit the uplink transmission according to a number of repetitions determined based on the received configuration and a priority level of the uplink transmission. In some implementations, the number of repetitions of each uplink transmission may be jointly determined with uplink priority (for example, priority level for an uplink transmission) and one or more other factors, such as UCI type, an SRS purpose, or any combination thereof.

The techniques employed by the described communication devices may provide benefits and enhancements such as implicitly indicating a number of repetitions for an uplink transmission based on priority to increase a reliability for successfully transmitting the uplink transmission. Additionally, the operations performed by the described communication devices may provide more efficient resource usage by mapping different number of repetitions of uplink transmissions to different priority levels, which may provide distinct advantages over other different techniques.

Figure 2:
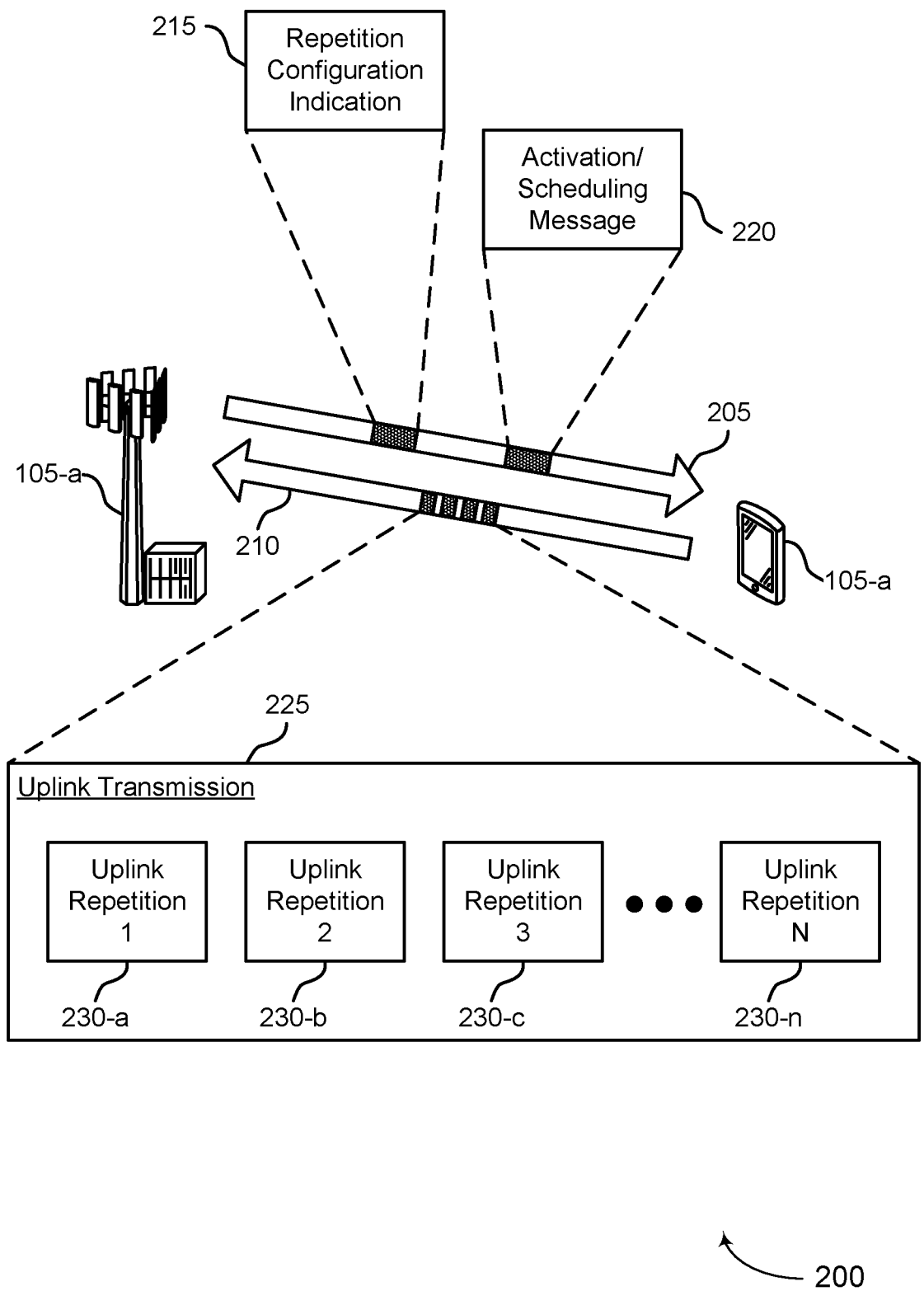
FIG. 2 illustrates an example of a wireless communications system that supports uplink transmission repetition based on uplink priority in accordance with aspects of the present disclosure.

FIG. 2 illustrates an example of a wireless communications system 200 that supports uplink transmission repetition based on uplink priority in accordance with aspects of the present disclosure. The wireless communications system 200 may implement aspects of or may be implemented by aspects of the wireless communications system 100. For example, the wireless communications system 200 may include a base station 105-a and a UE 115-a, which may represent examples of base stations 105 and UEs 115, respectively, as described with reference to FIG. 1. Additionally, the base station 105-a and the UE 115-a may communicate on resources of a carrier 205 (for example, for downlink communications) and of a carrier 210 (for example, for uplink communications). Although shown as separate carriers, the carrier 205 and the carrier 210 may include same or different resources (for example, time and frequency resources) for the corresponding transmissions.

In some examples, the UE 115-a and the base station 105-a may support high-reliable and low latency services (for example, URLLC services) and communicate according to corresponding constraints for the high-reliable and low latency services (for example, a reliability constraint of an error rate, such as a BLER, between $10^{-5}$ to $10^{-4}$ and a latency constraint of 1 ms end-to-end). To support the reliability constraints of the high-reliable and low latency services, transmissions between the UE 115-a and the base station 105-a may be repeated a number of times, such that whichever device receives the transmissions can combine the different repetitions to successfully receive and decode the transmissions.

For example, the base station 105-a may transmit downlink messages to the UE 115-a according to a number of repetitions (for example, indicated to the UE 115-a) to increase a probability that that the UE 115-a fully receives information carried by the downlink messages. Additionally or alternatively, the base station 105-a may indicate an uplink repetition configuration to the UE 115-a that includes a number of repetitions that the UE 115-a is to use for transmitting uplink messages to the base station 105-a to increase a probability that the base station 105-a fully receives information carried by the uplink messages.

Some wireless communications systems may support PUCCH repetition as a function of UCI type. However, as described previously with reference to FIG. 1, configuring an uplink repetition framework (for example, for a PUCCH repetition) merely as a function of UCI type may then be limited to UCI transmissions alone. Techniques are desired for repetition of any uplink transmission (for example, not limited to PUCCH or UCI transmissions alone).

The wireless communications system 200 may support an implicit indication of a number of uplink transmission repetitions, for example, based on uplink priority. As shown in the example of FIG. 2, the base station 105-a may assign repetitions for any uplink transmission as a function of uplink transmission priority using a repetition configuration indication 215 (for example, on resources of the carrier 205), in which different repetition values can be mapped to different priority levels. For example, uplink transmissions with higher priorities may be configured with higher numbers of repetitions as opposed to uplink transmissions with lower priorities. That is, an uplink transmission may have a first number of repetitions (X) for lower priority uplink transmissions and may have a second number of repetitions (Y) for higher priority uplink transmissions. In some examples, the base station 105-a may configure and indicate the first number of repetitions and the second number of repetitions (for example, via the repetition configuration indication 215) to the UE 115-a via higher layer signaling (for example, RRC signaling or configuration). Although two repetition values and two priority levels are discussed, the base station 105-a may configure a higher number of repetition values for a higher granularity of priority levels (for example, not limited to a highest priority level and a lowest priority level, such that one or more priority levels in between the highest and lowest priority levels may be defined).

In some examples, the base station 105-a may transmit one or more repetition configurations that are functions of uplink priority (for example, mapping different repetition values to the different priority levels) to the UE 115-a prior to transmitting the repetition configuration indication 215 to the UE 115-a. Additionally or alternatively, the UE 115-a may be preconfigured with multiple repetition configurations that are functions of uplink priority. In such examples, the base station 105-a may indicate (for example, via the repetition configuration indication 215) which of the different repetition configurations the UE 115-a is to use if determining a number of repetitions for transmitting a corresponding uplink message. For example, multiple configurations may be preconfigured at the UE 115-a, and the base station 105-a may signal which of the preconfigured configurations for the UE 115-a to use. Additionally or alternatively, if transmitting the repetition configuration indication 215, the base station 105-a may transmit a specific configuration that indicates a mapping between the repetition values and the priority levels.

After transmitting the repetition configuration indication 215, the base station 105-a may transmit an activation/scheduling message 220 to the UE 115-a (for example, on resources of the carrier 205). The activation/scheduling message 220 may activate or schedule an uplink transmission 225 for the UE 115-a to transmit to the base station 105-a. For example, the uplink transmission 225 may include a PUCCH, a physical uplink shared channel (PUSCH), an SRS, a physical random access channel (PRACH), or a different type of uplink message. Using a mapping between the repetition values and priority levels as indicated in the repetition configuration indication 215, the UE 115-a may determine a number of repetitions for sending the uplink transmission 225 to the base station 105-a based on a corresponding priority level of the uplink transmission 225. In some examples, the UE 115-a may determine the corresponding priority level of the uplink transmission 225 based on previous signaling or one or more configurations from the base station 105-a, being preconfigured with priority levels for different types of uplink transmissions, or both. Additionally or alternatively, the base station 105-a may indicate a corresponding priority level of the uplink transmission 225 in the activation/scheduling message 220 for the uplink transmission 215. In some examples, the activation/scheduling message 220 may include a scheduling/activating downlink control information (DCI) or RRC configuration.

In some implementations, the UE 115-a may determine a number of repetitions of each uplink transmission based on uplink priority (for example, priority levels) and one or more other factors. In some examples, the other factors may include a UCI type. For example, the number of repetitions may be eight (8), four (4), or two (2) for higher priority HARQ-ACK transmissions (for example, a first UCI type), scheduling request (SR) transmissions (for example, a second UCI type), and CSI reports (for example, a third UCI type), respectively, and the number of repetitions may be four (4), two (2), and one (1) for lower priority HARQ-ACK transmissions, SR transmissions, and CSI reports, respectively. That is, the number of repetitions may be based on both priority level and UCI type. Although specific repetition values are discussed for different UCI types of different priority levels, other repetition values may be mapped or configured to each UCI type and priority level.

Additionally or alternatively, the UE 115-a may determine a number of repetitions of each uplink transmission jointly with uplink priority (for example, priority levels) and SRS purpose. For example, the number of repetitions may be four (4), two (2), and one (1) for SRSs transmitted by the UE 115-a for antenna switching (for example, a first SRS purpose), codebook-based transmissions/non-codebook-based transmissions (for example, a second SRS purpose), and a beam management purpose (for example, a third SRS purpose). Although specific repetition values are discussed for different SRS purposes, other repetition values may be mapped or configured to the different SRS purposes (for example, those SRS purposes indicated previously or additional SRS purposes not listed) and priority level.

After determining the number of repetitions for the uplink transmission 225 (for example, based on the repetition configuration indication 215, the priority level of the uplink transmission 225, a UCI type of the uplink transmission 225, an SRS purpose of the uplink transmission 225, or any combination thereof), the UE 115-a may transmit the uplink transmission 225 to the base station 105-a (for example, on resources of the carrier 210) using uplink repetitions 230. For example, the UE 115-a may transmit the uplink transmission 225 using some combination of a first uplink repetition 230-a, a second uplink repetition 230-b, or a third uplink repetition 230-c, up to an N-th uplink repetition 230-n. The base station 105-a may use the uplink repetitions 230 of the uplink transmission 225 to increase a probability that data carried by the uplink transmission 225 is successfully received and decoded (for example, by combining the uplink repetitions 230 or by decoding portions of the data in a latter uplink repetition 230 such as uplink repetition 230-c that had been previously unsuccessfully received or decoded from a previous uplink repetition 230 such as uplink repetition 230-a). By indicating for the UE 115-a to transmit the uplink transmission 225 according to the uplink repetitions 230 and then UE 115-a transmitting the uplink repetitions 230, reliability may be increased for successful communication of the uplink transmission 225.

Figure 3:
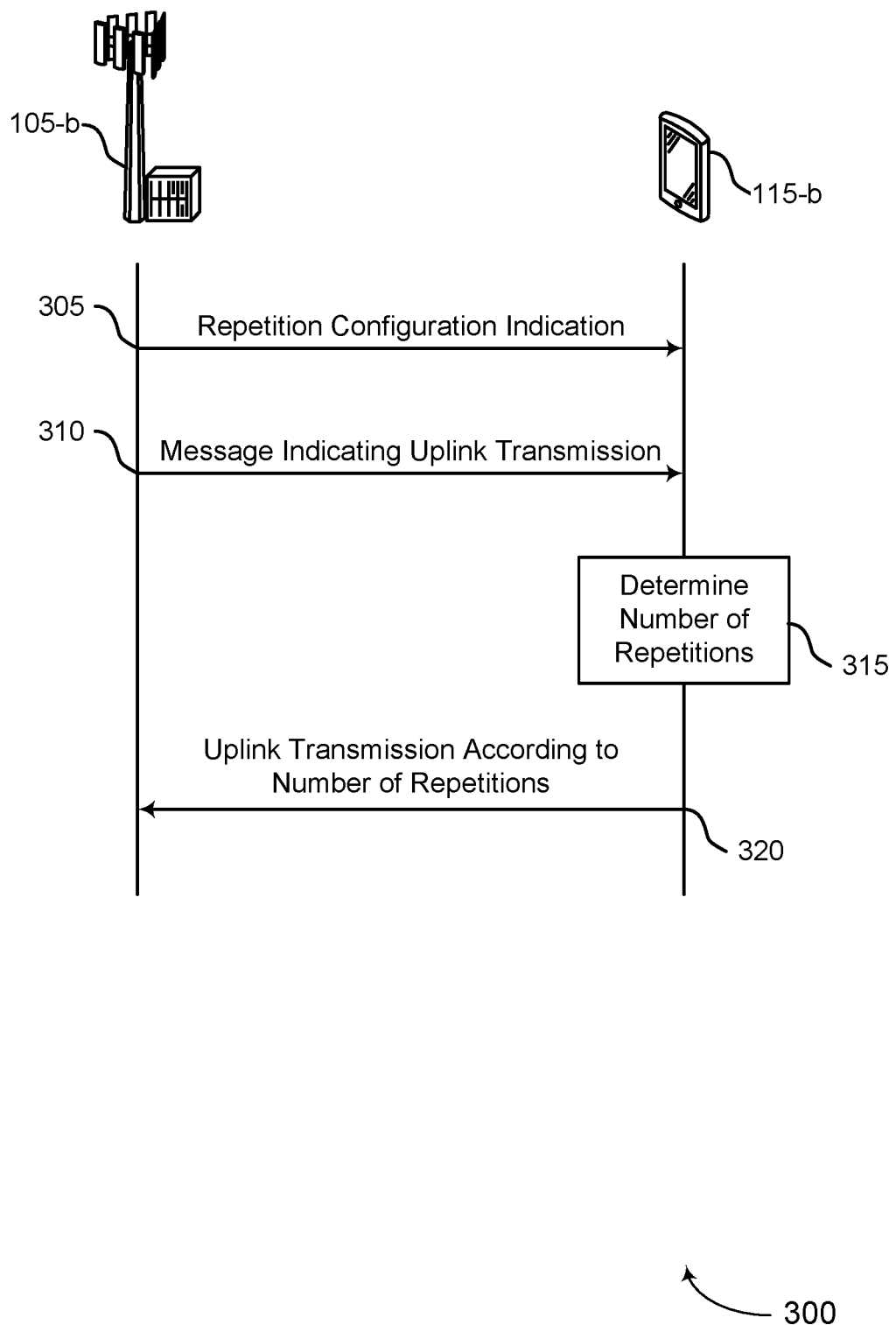
FIG. 3 illustrates an example of a process flow that supports uplink transmission repetition based on uplink priority in accordance with aspects of the present disclosure.

FIG. 3 illustrates an example of a process flow 300 that supports uplink transmission repetition based on uplink priority in accordance with aspects of the present disclosure. The process flow 300 may implement aspects of or may be implemented by aspects of the wireless communications systems 100 or 200 or both. For example, the process flow 300 may include a base station 105-b and a UE 115-b, which may represent examples of base stations 105 and UEs 115, respectively, as described with reference to FIGS. 1 and 2. Additionally, the UE 115-b and the base station 105-b may support high-reliable and low latency services (for example, URLLC services) and communicate according to corresponding constraints for the high-reliable and low latency services (for example, a reliability constraint of an error rate, such as a BLER, between $10^{-5}$ to $10^{-4}$ and a latency constraint of 1 ms end-to-end).

In the following description of the process flow 300, the operations between the UE 115-b and base station 105-b may be performed in different orders or at different times. Operations may also be left out of the process flow 300, or other operations may be added to the process flow 300. It is to be understood that although UE 115-b and base station 105-b are shown performing a number of the operations of process flow 300, any wireless device may perform the operations shown.

At 305, the UE 115-b may receive, from the base station 105-b, an indication of a repetition configuration for one or more uplink transmission types. For example, the UE 115-b may receive, from the base station 105-b, the indication of the repetition configuration via RRC signaling. In some examples, the repetition configuration may include a mapping of respective repetition values of a set of repetition values for the one or more uplink transmission types to at least respective priority levels of a set of priority levels. The one or more uplink transmission types may include a PUCCH transmission, a PUSCH transmission, an SRS transmission, a PRACH transmission, or any combination thereof. In some examples, multiple configurations may be preconfigured at the UE 115-b, and the base station 105-b may signal which of the preconfigured configurations for the UE 115-b to use via the indication of the repetition configuration.

In some examples, at 305, the UE 115-b may receive, from the base station 105-b, the repetition configuration including the mapping of the respective repetition values of the set of repetition values to the respective priority levels of the set of priority levels. For example, the base station 105-b may transmit a specific repetition configuration to the UE 115-b, which may be transmitted after the indication of the repetition configuration or before the indication of the repetition configuration.

At 310, the UE 115-b may receive, from the base station 105-b, a message indicating an uplink transmission of the one or more uplink transmission types to transmit to the base station 105-b. For example, the UE 115-b may receive, from the base station 105-b, a DCI message scheduling or activating the uplink transmission, an RRC configuration scheduling or activating the uplink transmission, or both. In some examples, the message may indicate the uplink transmission includes a priority indication indicating the priority level for the uplink transmission of the set of priority levels. Additionally or alternatively, each of the one or more uplink transmission types may be preconfigured with a corresponding priority level of the set of priority levels at the UE 115-b.

At 315, the UE 115-b may determine the number of repetitions determined based on the indication of the repetition configuration and a priority level for the uplink transmission of the set of priority levels. For example, the number of repetitions may be determined based on the priority level for the uplink information (for example, based on preconfigured priority levels for the one or more uplink transmission types at the UE 115-b) and the indication of the repetition configuration. Additionally or alternatively, the UE 115-b may determine the number of repetitions based on the priority indication in the message received at 310 and the indication of the repetition configuration.

In some examples, at 305, the UE 115-b may receive, from the base station 105-b, the repetition configuration including the mapping between the respective repetition values of the set of repetition values, the respective priority levels of the set of priority levels, and respective types of UCI of a set of types of UCI, and the uplink transmission may include an UCI transmission of a type of the set of types of uplink control information. At 315, the UE 115-b may determine the number of repetitions based on the type of the UCI transmission, the repetition configuration, and the priority level for the uplink transmission. In some examples, each type of the set of types of UCI may be mapped to multiple repetition values of the set of repetition values based on the set of priority levels. The set of types of UCI may include HARQ-ACK feedback, SRs, CSI reports, or any combination thereof.

Additionally or alternatively, in some examples, at 305, the UE 115-b may receive, from the base station 105-b, the repetition configuration including the mapping between the respective repetition values of the set of repetition values, the respective priority levels of the set of priority levels, and respective purposes for SRS transmissions of a set of purposes for SRS transmissions, and the uplink transmission may include an SRS transmission indicating a purpose of the set of purposes for SRS transmissions. At 315, the UE 115-b may determine the number of repetitions based on the purpose for the SRS transmission, the repetition configuration, and the priority level for the uplink transmission. In some examples, the set of purposes for SRS transmissions may include an antenna switching purpose, a codebook-based transmission purpose, a non-codebook-based transmission purpose, a beam management purpose, or any combination thereof.

At 320, the UE 115-b may transmit, to the base station 105-b in response to receiving the message at 310, the uplink transmission according to the determined number of repetitions. The base station 105-b may use the uplink repetitions of the uplink transmission received from the UE 115-b to increase a probability that data carried by the uplink transmission is successfully received and decoded by the base station 105-b (for example, by combining the uplink repetitions or by decoding portions of the data in a latter uplink repetition that had been previously unsuccessfully received or decoded from a previous uplink repetition).

Figure 4:
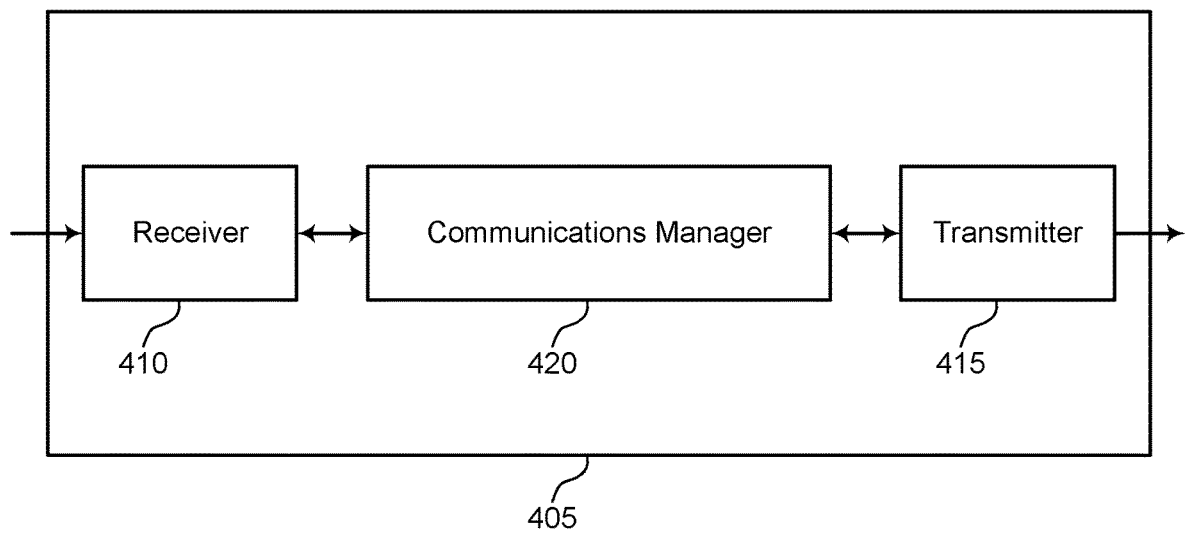
FIGS. 4 and 5 show block diagrams of devices that support uplink transmission repetition based on uplink priority in accordance with aspects of the present disclosure.

FIG. 4 shows a block diagram of a device 405 that supports uplink transmission repetition based on uplink priority in accordance with aspects of the present disclosure. The device 405 may be an example of aspects of a UE 115. The device 405 may include a receiver 410, a transmitter 415, and a communications manager 420. The communications manager 420 can be implemented, at least in part, by one or both of a modem and a processor. Each of these components may be in communication with one another (for example, via one or more buses).

The receiver 410 may provide a means for receiving information such as packets, user data, control information, or any combination thereof associated with various information channels (for example, control channels, data channels, information channels related to uplink transmission repetition based on uplink priority). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (for example, control channels, data channels, information channels related to uplink transmission repetition based on uplink priority). In some examples, the transmitter 415 may be co-located with a receiver 410 in a transceiver component. The transmitter 415 may utilize a single antenna or a set of multiple antennas.

The communications manager 420, the receiver 410, the transmitter 415, or various combinations thereof or various components thereof may be examples of means for performing various aspects of uplink transmission repetition based on uplink priority. For example, the communications manager 420, the receiver 410, the transmitter 415, or various combinations or components thereof may support a method for performing one or more of the functions described herein.

Additionally or alternatively, in some examples, the communications manager 420, the receiver 410, the transmitter 415, or various combinations or components thereof may be implemented in code (for example, as communications management software or firmware) executed by a processor. If implemented in code executed by a processor, the functions of the communications manager 420, the receiver 410, the transmitter 415, or various combinations or components thereof may be performed by a general-purpose processor, a digital signal processor (DSP), a central processing unit (CPU), an application-specific integrated circuit (ASIC), a field-programmable gate array (FPGA), or any combination of these or other programmable logic devices (for example, configured as or otherwise supporting a means for performing the functions described in the present disclosure).

In some examples, the communications manager 420 may be configured to perform various operations (for example, receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations.

The communications manager 420 may support wireless communications at a UE in accordance with examples as disclosed herein. For example, the communications manager 420 may be configured as or otherwise support a means for receiving, from a base station, an indication of a repetition configuration for one or more uplink transmission types, the repetition configuration including a mapping of respective repetition values of a set of multiple repetition values for the one or more uplink transmission types to at least respective priority levels of a set of multiple priority levels. The communications manager 420 may be configured as or otherwise support a means for receiving, from the base station, a message indicating an uplink transmission of the one or more uplink transmission types to transmit to the base station. The communications manager 420 may be configured as or otherwise support a means for transmitting, to the base station in response to receiving the message, the uplink transmission according to a number of repetitions that is based on the indication of the repetition configuration and a priority level for the uplink transmission of the set of multiple priority levels.

By including or configuring the communications manager 420 in accordance with examples, the device 405 (for example, a processor controlling or otherwise coupled to the receiver 410, the transmitter 415, the communications manager 420, or any combination thereof) may support techniques for improved reliability and more efficient utilization of communication resources. For example, operations performed by the device 405 may provide improvements to reliability based on an uplink transmission being repeated a number of times. Additionally, the operations performed by the device 405 may provide more efficient resource usage by mapping different number of repetitions of uplink transmissions to different priority levels, such that lower priority uplink transmissions are repeated fewer times to reduce signaling overhead and a higher amount of resources from being used.

Figure 5:
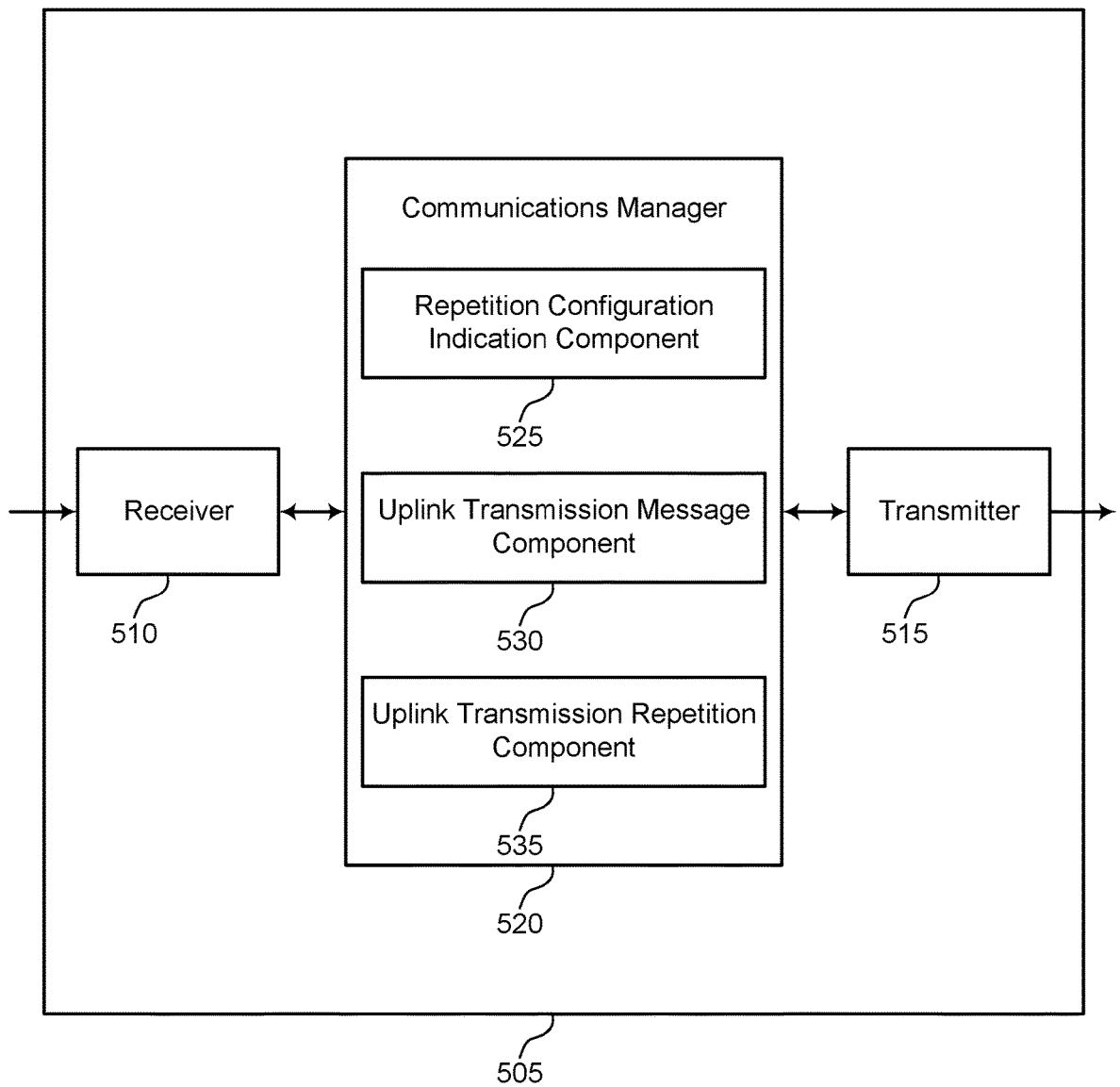

FIG. 5 shows a block diagram of a device 505 that supports uplink transmission repetition based on uplink priority in accordance with aspects of the present disclosure. The device 505 may be an example of aspects of a device 405 or a UE 115. The device 505 may include a receiver 510, a transmitter 515, and a communications manager 520. The communications manager 520 can be implemented, at least in part, by one or both of a modem and a processor. Each of these components may be in communication with one another (for example, via one or more buses).

The receiver 510 may provide a means for receiving information such as packets, user data, control information, or any combination thereof associated with various information channels (for example, control channels, data channels, information channels related to uplink transmission repetition based on uplink priority). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (for example, control channels, data channels, information channels related to uplink transmission repetition based on uplink priority). In some examples, the transmitter 515 may be co-located with a receiver 510 in a transceiver component. The transmitter 515 may utilize a single antenna or a set of multiple antennas.

The device 505, or various components thereof, may be an example of means for performing various aspects of uplink transmission repetition based on uplink priority. For example, the communications manager 520 may include a repetition configuration indication component 525, an uplink transmission message component 530, an uplink transmission repetition component 535, or any combination thereof. In some examples, the communications manager 520, or various components thereof, may be configured to perform various operations (for example, receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations.

The communications manager 520 may support wireless communications at a UE in accordance with examples as disclosed herein. The repetition configuration indication component 525 may be configured as or otherwise support a means for receiving, from a base station, an indication of a repetition configuration for one or more uplink transmission types, the repetition configuration including a mapping of respective repetition values of a set of multiple repetition values for the one or more uplink transmission types to at least respective priority levels of a set of multiple priority levels. The uplink transmission message component 530 may be configured as or otherwise support a means for receiving, from the base station, a message indicating an uplink transmission of the one or more uplink transmission types to transmit to the base station. The uplink transmission repetition component 535 may be configured as or otherwise support a means for transmitting, to the base station in response to receiving the message, the uplink transmission according to a number of repetitions that is based on the indication of the repetition configuration and a priority level for the uplink transmission of the set of multiple priority levels.

Figure 6:
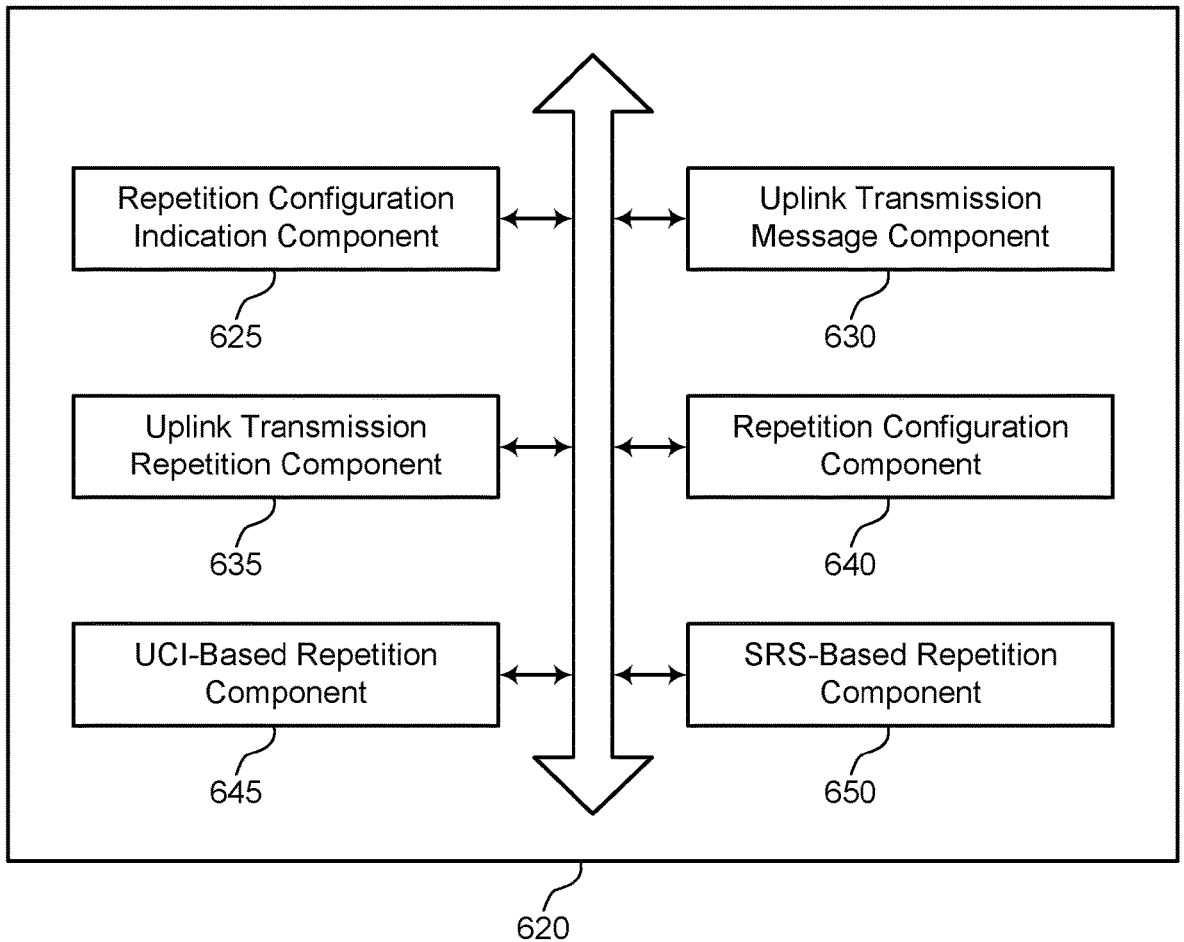
FIG. 6 shows a block diagram of a communications manager that supports uplink transmission repetition based on uplink priority in accordance with aspects of the present disclosure.

FIG. 6 shows a block diagram of a communications manager 620 that supports uplink transmission repetition based on uplink priority in accordance with aspects of the present disclosure. The communications manager 620, or various components thereof, may be an example of means for performing various aspects of uplink transmission repetition based on uplink priority. For example, the communications manager 620 may include a repetition configuration indication component 625, an uplink transmission message component 630, an uplink transmission repetition component 635, a repetition configuration component 640, a UCI-based repetition component 645, an SRS-based repetition component 650, or any combination thereof. Each of these components may communicate, directly or indirectly, with one another (for example, via one or more buses).

The communications manager 620 may support wireless communications at a UE in accordance with examples as disclosed herein. The repetition configuration indication component 625 may be configured as or otherwise support a means for receiving, from a base station, an indication of a repetition configuration for one or more uplink transmission types, the repetition configuration including a mapping of respective repetition values of a set of multiple repetition values for the one or more uplink transmission types to at least respective priority levels of a set of multiple priority levels. The uplink transmission message component 630 may be configured as or otherwise support a means for receiving, from the base station, a message indicating an uplink transmission of the one or more uplink transmission types to transmit to the base station. The uplink transmission repetition component 635 may be configured as or otherwise support a means for transmitting, to the base station in response to receiving the message, the uplink transmission according to a number of repetitions that is based on the indication of the repetition configuration and a priority level for the uplink transmission of the set of multiple priority levels.

In some examples, to support receiving the indication of the repetition configuration, the repetition configuration component 640 may be configured as or otherwise support a means for receiving the repetition configuration including the mapping, in which the number of repetitions is based on the priority level for the uplink transmission and the repetition configuration.

In some examples, the message indicating the uplink transmission includes a priority indication indicating the priority level for the uplink transmission of the set of multiple priority levels, and the uplink transmission message component 630 may be configured as or otherwise support a means for determining the number of repetitions based on the priority indication and the indication of the repetition configuration.

In some examples, to support receiving the indication of the repetition configuration, the UCI-based repetition component 645 may be configured as or otherwise support a means for receiving, from the base station, the repetition configuration including the mapping between the respective repetition values of the set of multiple repetition values, the respective priority levels of the set of multiple priority levels, and respective types of UCI of a set of multiple types of UCI, in which the uplink transmission includes an UCI transmission of a type of the set of multiple types of UCI and the number of repetitions is based on the type of the UCI transmission, the repetition configuration, and the priority level for the uplink transmission.

In some examples, each type of the set of multiple types of UCI is mapped to multiple repetition values of the set of multiple repetition values based on the set of multiple priority levels.

In some examples, the set of multiple types of UCI includes HARQ-ACK feedback, SRs, CSI reports, or any combination thereof.

In some examples, to support receiving the indication of the repetition configuration, the SRS-based repetition component 650 may be configured as or otherwise support a means for receiving, from the base station, the repetition configuration including the mapping between the respective repetition values of the set of multiple repetition values, the respective priority levels of the set of multiple priority levels, and respective purposes for SRS transmissions of a set of multiple purposes for SRS transmissions, in which the uplink transmission includes an SRS transmission indicating a purpose of the set of multiple purposes for SRS transmissions and the number of repetitions is based on the purpose for the SRS transmission, the repetition configuration, and the priority level for the uplink transmission.

In some examples, the set of multiple purposes for SRS transmissions includes an antenna switching purpose, a codebook-based transmission purpose, a non-codebook-based transmission purpose, a beam management purpose, or any combination thereof.

In some examples, to support receiving the indication of the repetition configuration, the repetition configuration indication component 625 may be configured as or otherwise support a means for receiving, from the base station, the indication of the repetition configuration via RRC signaling.

In some examples, to support receiving the message indicating the uplink transmission, the uplink transmission message component 630 may be configured as or otherwise support a means for receiving, from the base station, a DCI message scheduling or activating the uplink transmission, an RRC configuration scheduling or activating the uplink transmission, or both.

In some examples, the one or more uplink transmission types include a PUCCH transmission, a PUSCH transmission, an SRS transmission, a PRACH transmission, or any combination thereof.

In some examples, each of the one or more uplink transmission types are preconfigured with a corresponding priority level of the set of multiple priority levels at the UE.

Figure 7:
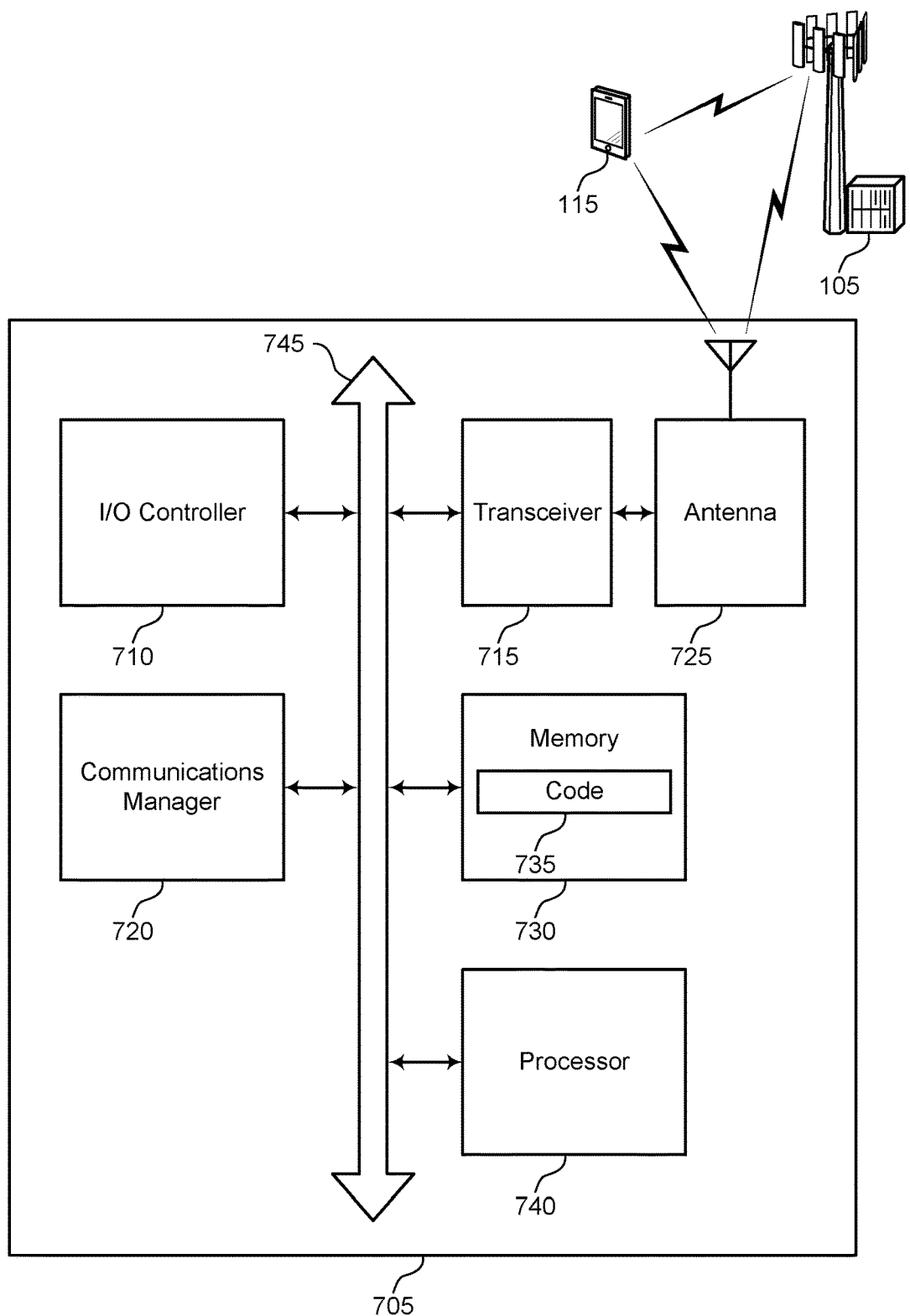
FIG. 7 shows a diagram of a system including a device that supports uplink transmission repetition based on uplink priority in accordance with aspects of the present disclosure.

FIG. 7 shows a diagram of a system 700 including a device 705 that supports uplink transmission repetition based on uplink priority in accordance with aspects of the present disclosure. The device 705 may be an example of or include the components of a device 405, a device 505, or a UE 115. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (for example, operatively, communicatively, functionally, electronically, electrically) via one or more buses (for example, a bus 745).

The I/O controller 710 may manage input and output signals for the device 705. The I/O controller 710 may also manage peripherals not integrated into the device 705. In some examples, the I/O controller 710 may represent a physical connection or port to an external peripheral. In some examples, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some examples, the I/O controller 710 may be implemented as part of a processor, such as the processor 740. In some examples, a user may interact with the device 705 via the I/O controller 710 or via hardware components controlled by the I/O controller 710.

In some examples, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some examples, the code 735 may not be directly executable by the processor 740 but may cause a computer (for example, when compiled and executed) to perform functions described herein. In some examples, the memory 730 may contain, among other things, a basic I/O system (BIOS) which may control basic hardware or software operation such as the interaction with peripheral components or devices.

The processor 740 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 740 may be configured to operate a memory array using a memory controller. In some other cases, a memory controller may be integrated into the processor 740. The processor 740 may be configured to execute computer-readable instructions stored in a memory (for example, the memory 730) to cause the device 705 to perform various functions (for example, functions or tasks supporting uplink transmission repetition based on uplink priority). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a base station, an indication of a repetition configuration for one or more uplink transmission types, the repetition configuration including a mapping of respective repetition values of a set of multiple repetition values for the one or more uplink transmission types to at least respective priority levels of a set of multiple priority levels. The communications manager 720 may be configured as or otherwise support a means for receiving, from the base station, a message indicating an uplink transmission of the one or more uplink transmission types to transmit to the base station. The communications manager 720 may be configured as or otherwise support a means for transmitting, to the base station in response to receiving the message, the uplink transmission according to a number of repetitions that is based on the indication of the repetition configuration and a priority level for the uplink transmission of the set of multiple priority levels.

By including or configuring the communications manager 720 in accordance with examples, the device 705 may support techniques for improved communication reliability, more efficient utilization of communication resources, and improved coordination between devices. For example, operations performed by the device 705 may provide improvements to reliability based on an uplink transmission being repeated a number of times. Additionally, the operations performed by the device 705 may provide more efficient resource usage by mapping different number of repetitions of uplink transmissions to different priority levels, such that lower priority uplink transmissions are repeated fewer times to reduce signaling overhead and a higher amount of resources from being used. Additionally, the device 705 may coordinate with a network device (for example, base station 105) to determine a number of repetitions for transmitting an uplink message to the network device based on signaling from the network device.

In some examples, the communications manager 720 may be configured to perform various operations (for example, receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of uplink transmission repetition based on uplink priority, or the processor 740 and the memory 730 may be otherwise configured to perform or support such operations.

Figure 8:
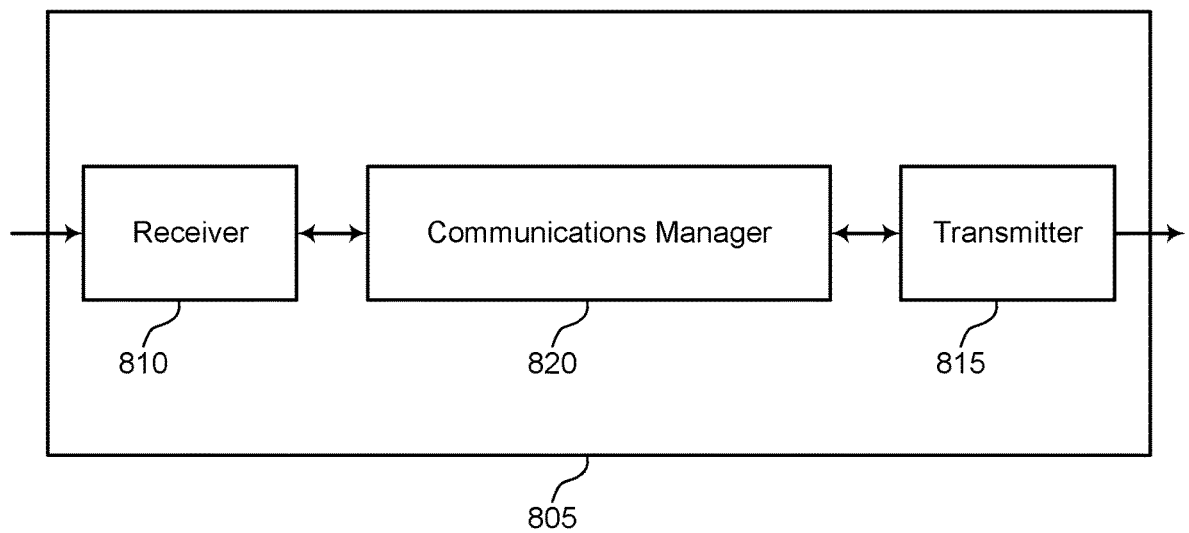
FIGS. 8 and 9 show block diagrams of devices that support uplink transmission repetition based on uplink priority in accordance with aspects of the present disclosure.

FIG. 8 shows a block diagram of a device 805 that supports uplink transmission repetition based on uplink priority in accordance with aspects of the present disclosure. The device 805 may be an example of aspects of a base station 105. The device 805 may include a receiver 810, a transmitter 815, and a communications manager 820. The communications manager 820 can be implemented, at least in part, by one or both of a modem and a processor. Each of these components may be in communication with one another (for example, via one or more buses).

The receiver 810 may provide a means for receiving information such as packets, user data, control information, or any combination thereof associated with various information channels (for example, control channels, data channels, information channels related to uplink transmission repetition based on uplink priority). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (for example, control channels, data channels, information channels related to uplink transmission repetition based on uplink priority). In some examples, the transmitter 815 may be co-located with a receiver 810 in a transceiver component. The transmitter 815 may utilize a single antenna or a set of multiple antennas.

The communications manager 820, the receiver 810, the transmitter 815, or various combinations thereof or various components thereof may be examples of means for performing various aspects of uplink transmission repetition based on uplink priority. For example, the communications manager 820, the receiver 810, the transmitter 815, or various combinations or components thereof may support a method for performing one or more of the functions described herein.

Additionally or alternatively, in some examples, the communications manager 820, the receiver 810, the transmitter 815, or various combinations or components thereof may be implemented in code (for example, as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (for example, configured as or otherwise supporting a means for performing the functions described in the present disclosure).

In some examples, the communications manager 820 may be configured to perform various operations (for example, receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations.

The communications manager 820 may support wireless communications at a base station in accordance with examples as disclosed herein. For example, the communications manager 820 may be configured as or otherwise support a means for transmitting, to a UE, an indication of a repetition configuration for one or more uplink transmission types, the repetition configuration including a mapping of respective repetition values of a set of multiple repetition values for the one or more uplink transmission types to at least respective priority levels of a set of multiple priority levels. The communications manager 820 may be configured as or otherwise support a means for transmitting, to the UE, a message indicating an uplink transmission of the one or more uplink transmission types for the UE to transmit to the base station. The communications manager 820 may be configured as or otherwise support a means for receiving, from the UE in response to transmitting the message, the uplink transmission according to a number of repetitions that is based on the indication of the repetition configuration and a priority level for the uplink transmission of the set of multiple priority levels.

Figure 9:
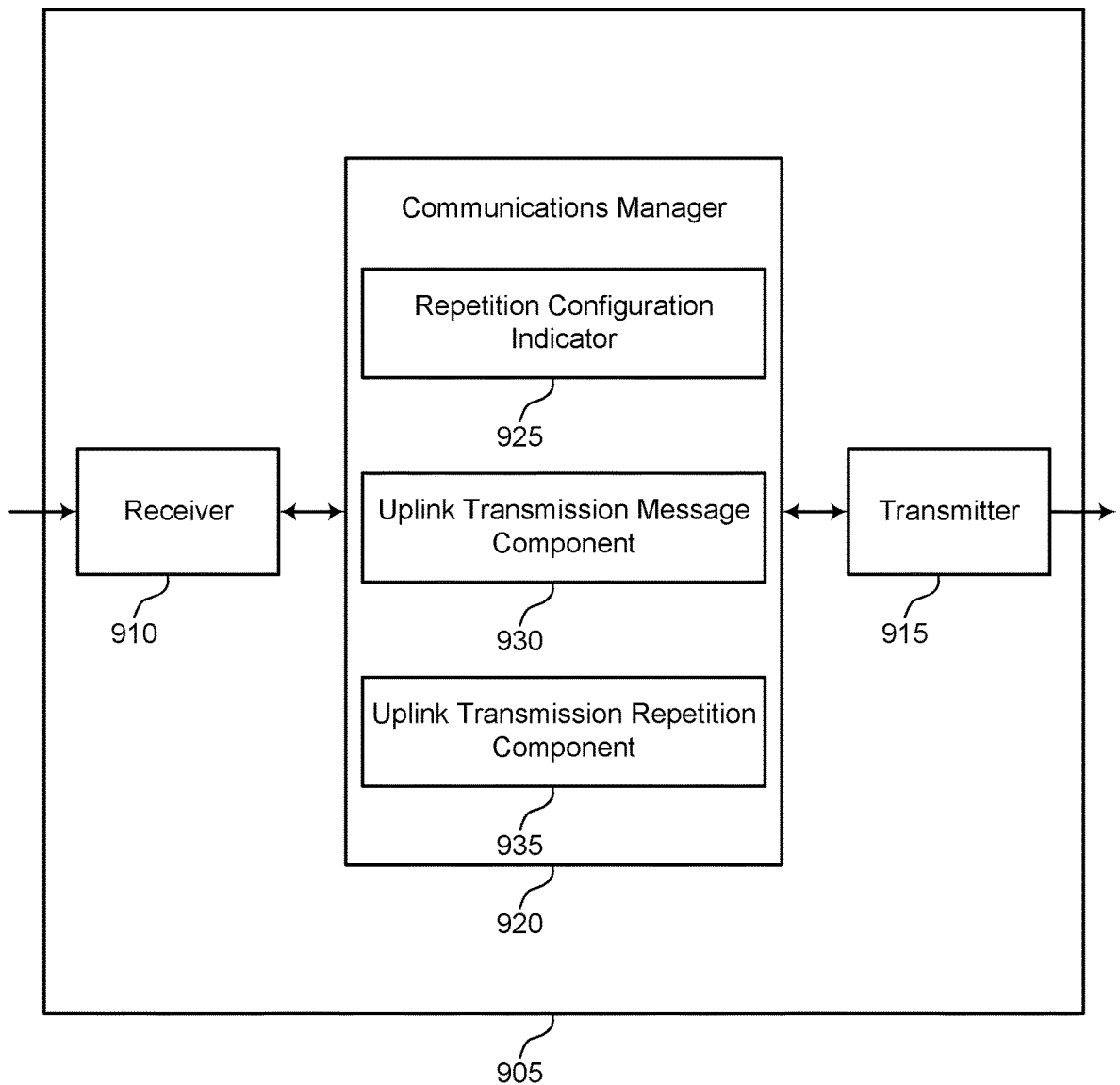

FIG. 9 shows a block diagram of a device 905 that supports uplink transmission repetition based on uplink priority in accordance with aspects of the present disclosure. The device 905 may be an example of aspects of a device 805 or a base station 105. The device 905 may include a receiver 910, a transmitter 915, and a communications manager 920. The communications manager 920 can be implemented, at least in part, by one or both of a modem and a processor. Each of these components may be in communication with one another (for example, via one or more buses).

The receiver 910 may provide a means for receiving information such as packets, user data, control information, or any combination thereof associated with various information channels (for example, control channels, data channels, information channels related to uplink transmission repetition based on uplink priority). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (for example, control channels, data channels, information channels related to uplink transmission repetition based on uplink priority). In some examples, the transmitter 915 may be co-located with a receiver 910 in a transceiver component. The transmitter 915 may utilize a single antenna or a set of multiple antennas.

The device 905, or various components thereof, may be an example of means for performing various aspects of uplink transmission repetition based on uplink priority. For example, the communications manager 920 may include a repetition configuration indicator 925, an uplink transmission message component 930, an uplink transmission repetition component 935, or any combination thereof. In some examples, the communications manager 920, or various components thereof, may be configured to perform various operations (for example, receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations.

The communications manager 920 may support wireless communications at a base station in accordance with examples as disclosed herein. The repetition configuration indicator 925 may be configured as or otherwise support a means for transmitting, to a UE, an indication of a repetition configuration for one or more uplink transmission types, the repetition configuration including a mapping of respective repetition values of a set of multiple repetition values for the one or more uplink transmission types to at least respective priority levels of a set of multiple priority levels. The uplink transmission message component 930 may be configured as or otherwise support a means for transmitting, to the UE, a message indicating an uplink transmission of the one or more uplink transmission types for the UE to transmit to the base station. The uplink transmission repetition component 935 may be configured as or otherwise support a means for receiving, from the UE in response to transmitting the message, the uplink transmission according to a number of repetitions that is based on the indication of the repetition configuration and a priority level for the uplink transmission of the set of multiple priority levels.

Figure 10:
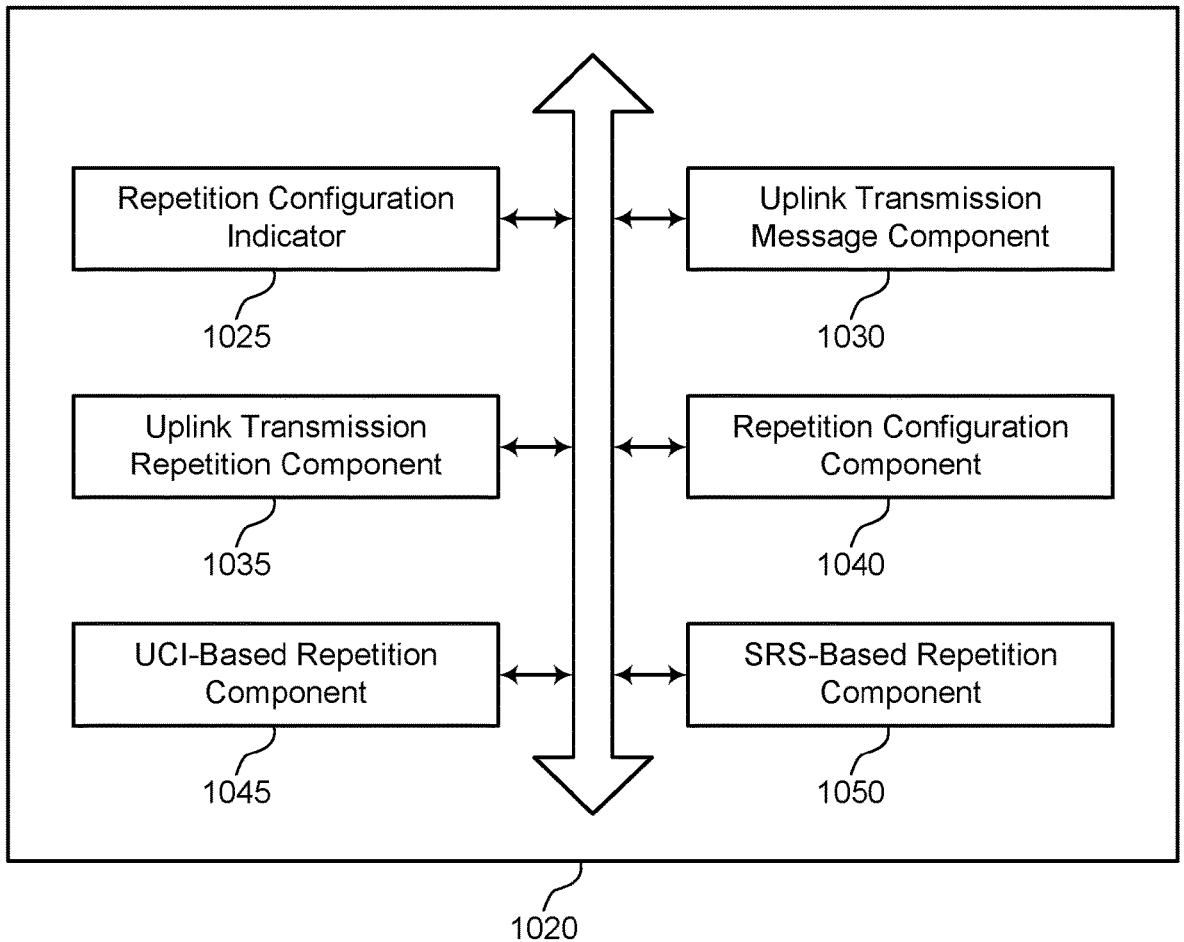
FIG. 10 shows a block diagram of a communications manager that supports uplink transmission repetition based on uplink priority in accordance with aspects of the present disclosure.

FIG. 10 shows a block diagram of a communications manager 1020 that supports uplink transmission repetition based on uplink priority in accordance with aspects of the present disclosure. The communications manager 1020, or various components thereof, may be an example of means for performing various aspects of uplink transmission repetition based on uplink priority. For example, the communications manager 1020 may include a repetition configuration indicator 1025, an uplink transmission message component 1030, an uplink transmission repetition component 1035, a repetition configuration component 1040, a UCI-based repetition component 1045, an SRS-based repetition component 1050, or any combination thereof. Each of these components may communicate, directly or indirectly, with one another (for example, via one or more buses).

The communications manager 1020 may support wireless communications at a base station in accordance with examples as disclosed herein. The repetition configuration indicator 1025 may be configured as or otherwise support a means for transmitting, to a UE, an indication of a repetition configuration for one or more uplink transmission types, the repetition configuration including a mapping of respective repetition values of a set of multiple repetition values for the one or more uplink transmission types to at least respective priority levels of a set of multiple priority levels. The uplink transmission message component 1030 may be configured as or otherwise support a means for transmitting, to the UE, a message indicating an uplink transmission of the one or more uplink transmission types for the UE to transmit to the base station. The uplink transmission repetition component 1035 may be configured as or otherwise support a means for receiving, from the UE in response to transmitting the message, the uplink transmission according to a number of repetitions that is based on the indication of the repetition configuration and a priority level for the uplink transmission of the set of multiple priority levels.

In some examples, to support transmitting the indication of the repetition configuration, the repetition configuration component 1040 may be configured as or otherwise support a means for transmitting the repetition configuration including the mapping, in which the number of repetitions is based on the priority level for the uplink transmission and the repetition configuration.

In some examples, the message indicating the uplink transmission includes a priority indication indicating the priority level for the uplink transmission of the set of multiple priority levels, and the uplink transmission message component 1030 may be configured as or otherwise support a means for determining the number of repetitions based on the priority indication and the indication of the repetition configuration.

In some examples, to support transmitting the indication of the repetition configuration, the UCI-based repetition component 1045 may be configured as or otherwise support a means for transmitting, to the UE, the repetition configuration including the mapping between the respective repetition values of the set of multiple repetition values, the respective priority levels of the set of multiple priority levels, and respective types of UCI of a set of multiple types of UCI, in which the uplink transmission includes an UCI transmission of a type of the set of multiple types of UCI and the number of repetitions is based on the type of the UCI transmission, the repetition configuration, and the priority level for the uplink transmission.

In some examples, each type of the set of multiple types of UCI is mapped to multiple repetition values of the set of multiple repetition values based on the set of multiple priority levels.

In some examples, the set of multiple types of UCI includes HARQ-ACK feedback, SRs, CSI reports, or any combination thereof.

In some examples, to support transmitting the indication of the repetition configuration, the SRS-based repetition component 1050 may be configured as or otherwise support a means for transmitting, to the UE, the repetition configuration including the mapping between the respective repetition values of the set of multiple repetition values, the respective priority levels of the set of multiple priority levels, and respective purposes for SRS transmissions of a set of multiple purposes for SRS transmissions, in which the uplink transmission includes an SRS transmission indicating a purpose of the set of multiple purposes for SRS transmissions and the number of repetitions is based on the purpose for the SRS transmission, the repetition configuration, and the priority level for the uplink transmission.

In some examples, the set of multiple purposes for SRS transmissions includes an antenna switching purpose, a codebook-based transmission purpose, a non-codebook-based transmission purpose, a beam management purpose, or any combination thereof.

In some examples, to support transmitting the indication of the repetition configuration, the repetition configuration indicator 1025 may be configured as or otherwise support a means for transmitting, to the UE, the indication of the repetition configuration via RRC signaling.

In some examples, to support transmitting the message indicating the uplink transmission, the uplink transmission message component 1030 may be configured as or otherwise support a means for transmitting, to the UE, a DCI message scheduling or activating the uplink transmission, an RRC configuration scheduling or activating the uplink transmission, or both.

In some examples, the one or more uplink transmission types include a PUCCH transmission, a PUSCH transmission, an SRS transmission, a PRACH transmission, or any combination thereof.

Figure 11:
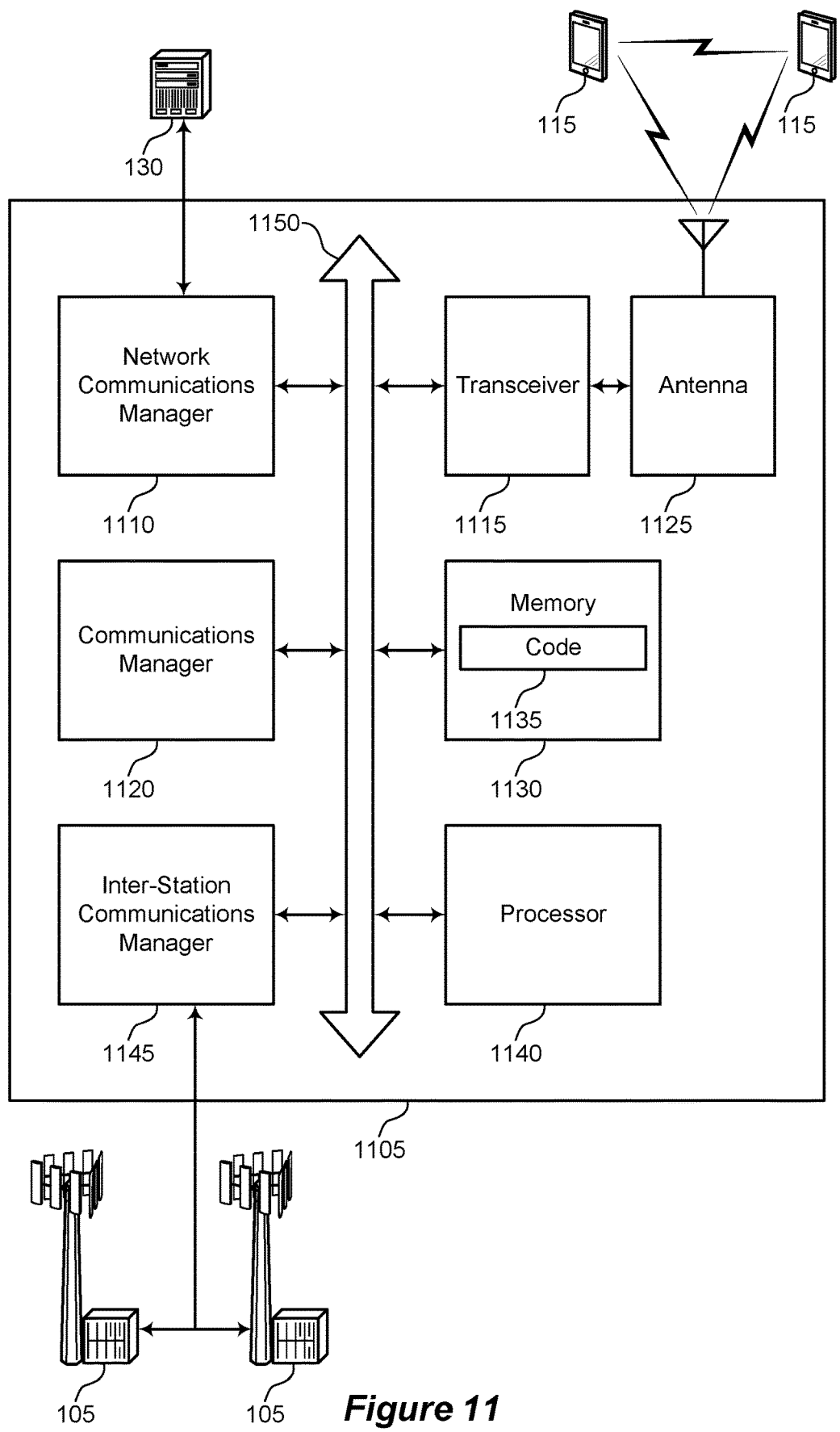
FIG. 11 shows a diagram of a system including a device that supports uplink transmission repetition based on uplink priority in accordance with aspects of the present disclosure.

FIG. 11 shows a diagram of a system including a device 1105 that supports uplink transmission repetition based on uplink priority in accordance with aspects of the present disclosure. The device 1105 may be an example of or include the components of a device 805, a device 905, or a base station 105. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (for example, operatively, communicatively, functionally, electronically, electrically) via one or more buses (for example, a bus 1150).

The network communications manager 1110 may manage communications with a core network 130 (for example, via one or more wired backhaul links). For example, the network communications manager 1110 may manage the transfer of data communications for client devices, such as one or more UEs 115.

In some examples, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some examples, the code 1135 may not be directly executable by the processor 1140 but may cause a computer (for example, when compiled and executed) to perform functions described herein. In some examples, the memory 1130 may contain, among other things, a BIOS which may control basic hardware or software operation such as the interaction with peripheral components or devices.

The processor 1140 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1140 may be configured to operate a memory array using a memory controller. In some other cases, a memory controller may be integrated into the processor 1140. The processor 1140 may be configured to execute computer-readable instructions stored in a memory (for example, the memory 1130) to cause the device 1105 to perform various functions (for example, functions or tasks supporting uplink transmission repetition based on uplink priority). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for transmitting, to a UE, an indication of a repetition configuration for one or more uplink transmission types, the repetition configuration including a mapping of respective repetition values of a set of multiple repetition values for the one or more uplink transmission types to at least respective priority levels of a set of multiple priority levels. The communications manager 1120 may be configured as or otherwise support a means for transmitting, to the UE, a message indicating an uplink transmission of the one or more uplink transmission types for the UE to transmit to the base station. The communications manager 1120 may be configured as or otherwise support a means for receiving, from the UE in response to transmitting the message, the uplink transmission according to a number of repetitions that is based on the indication of the repetition configuration and a priority level for the uplink transmission of the set of multiple priority levels.

In some examples, the communications manager 1120 may be configured to perform various operations (for example, receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of uplink transmission repetition based on uplink priority, or the processor 1140 and the memory 1130 may be otherwise configured to perform or support such operations.

Figure 12:
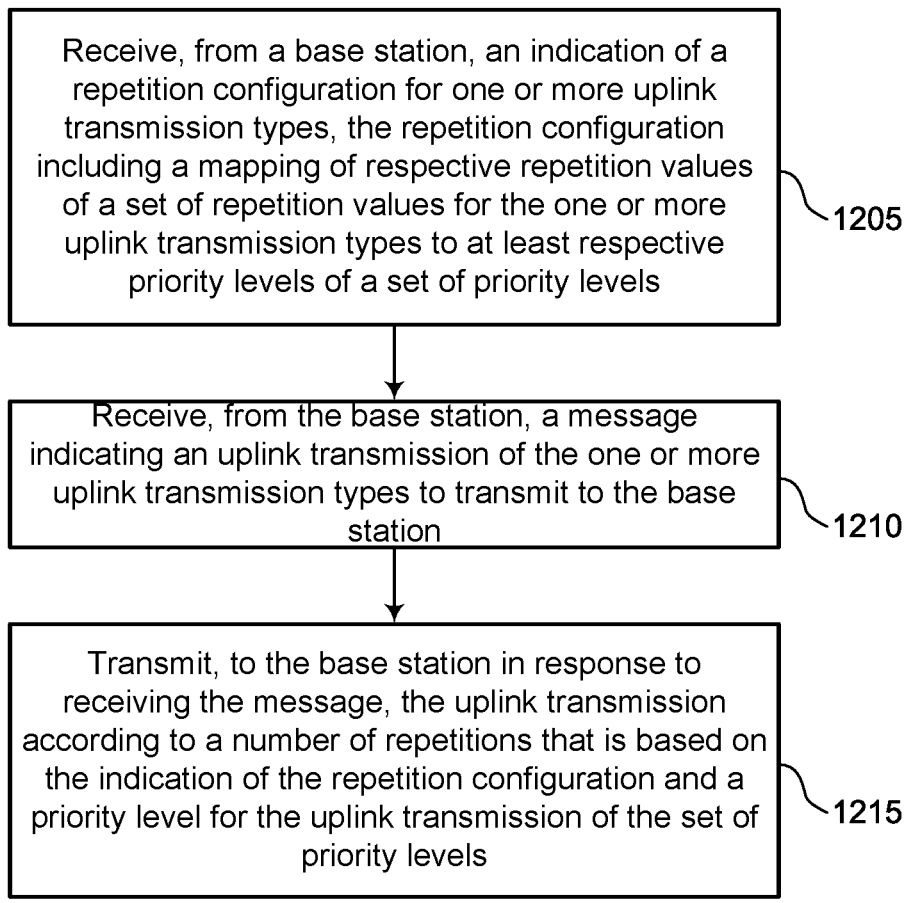
FIGS. 12-18 show flowcharts illustrating methods that support uplink transmission repetition based on uplink priority in accordance with aspects of the present disclosure.

FIG. 12 shows a flowchart illustrating a method that supports uplink transmission repetition based on uplink priority in accordance with aspects of the present disclosure. The operations of the method may be implemented by a UE or its components. For example, the operations of the method may be performed by a UE 115 as described with reference to FIGS. 1-7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, an indication of a repetition configuration for one or more uplink transmission types, the repetition configuration including a mapping of respective repetition values of a set of multiple repetition values for the one or more uplink transmission types to at least respective priority levels of a set of multiple priority levels. The operations of 1205 may be performed in accordance with examples as disclosed herein. In some examples, aspects of the operations of 1205 may be performed by a repetition configuration indication component 625 as described with reference to FIG. 6.

At 1210, the method may include receiving, from the base station, a message indicating an uplink transmission of the one or more uplink transmission types to transmit to the base station. The operations of 1210 may be performed in accordance with examples as disclosed herein. In some examples, aspects of the operations of 1210 may be performed by an uplink transmission message component 630 as described with reference to FIG. 6.

At 1215, the method may include transmitting, to the base station in response to receiving the message, the uplink transmission according to a number of repetitions that is based on the indication of the repetition configuration and a priority level for the uplink transmission of the set of multiple priority levels. The operations of 1215 may be performed in accordance with examples as disclosed herein. In some examples, aspects of the operations of 1215 may be performed by an uplink transmission repetition component 635 as described with reference to FIG. 6.

Figure 13:
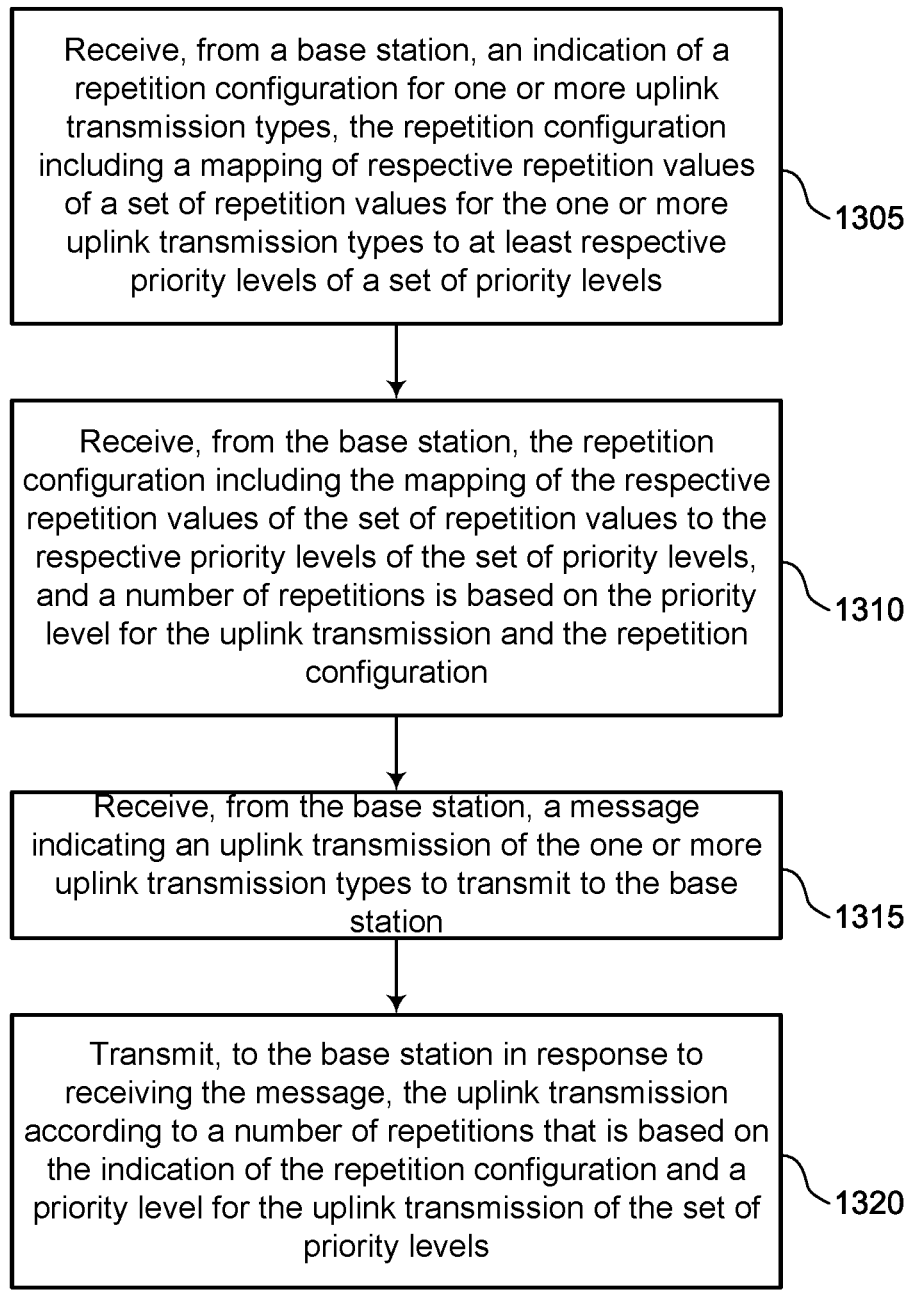

FIG. 13 shows a flowchart illustrating a method that supports uplink transmission repetition based on uplink priority in accordance with aspects of the present disclosure. The operations of the method may be implemented by a UE or its components. For example, the operations of the method may be performed by a UE 115 as described with reference to FIGS. 1-7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, an indication of a repetition configuration for one or more uplink transmission types, the repetition configuration including a mapping of respective repetition values of a set of multiple repetition values for the one or more uplink transmission types to at least respective priority levels of a set of multiple priority levels. The operations of 1305 may be performed in accordance with examples as disclosed herein. In some examples, aspects of the operations of 1305 may be performed by a repetition configuration indication component 625 as described with reference to FIG. 6.

At 1310, the method may include receiving, from the base station, the repetition configuration including the mapping of the respective repetition values of the set of multiple repetition values to the respective priority levels of the set of multiple priority levels, and a number of repetitions is based on the priority level for the uplink transmission and the repetition configuration. The operations of 1310 may be performed in accordance with examples as disclosed herein. In some examples, aspects of the operations of 1310 may be performed by a repetition configuration component 640 as described with reference to FIG. 6.

At 1315, the method may include receiving, from the base station, a message indicating an uplink transmission of the one or more uplink transmission types to transmit to the base station. The operations of 1315 may be performed in accordance with examples as disclosed herein. In some examples, aspects of the operations of 1315 may be performed by an uplink transmission message component 630 as described with reference to FIG. 6.

At 1320, the method may include transmitting, to the base station in response to receiving the message, the uplink transmission according to the number of repetitions, the number of repetitions determined based on the indication of the repetition configuration and a priority level for the uplink transmission of the set of multiple priority levels. The operations of 1320 may be performed in accordance with examples as disclosed herein. In some examples, aspects of the operations of 1320 may be performed by an uplink transmission repetition component 635 as described with reference to FIG. 6.

Figure 14:
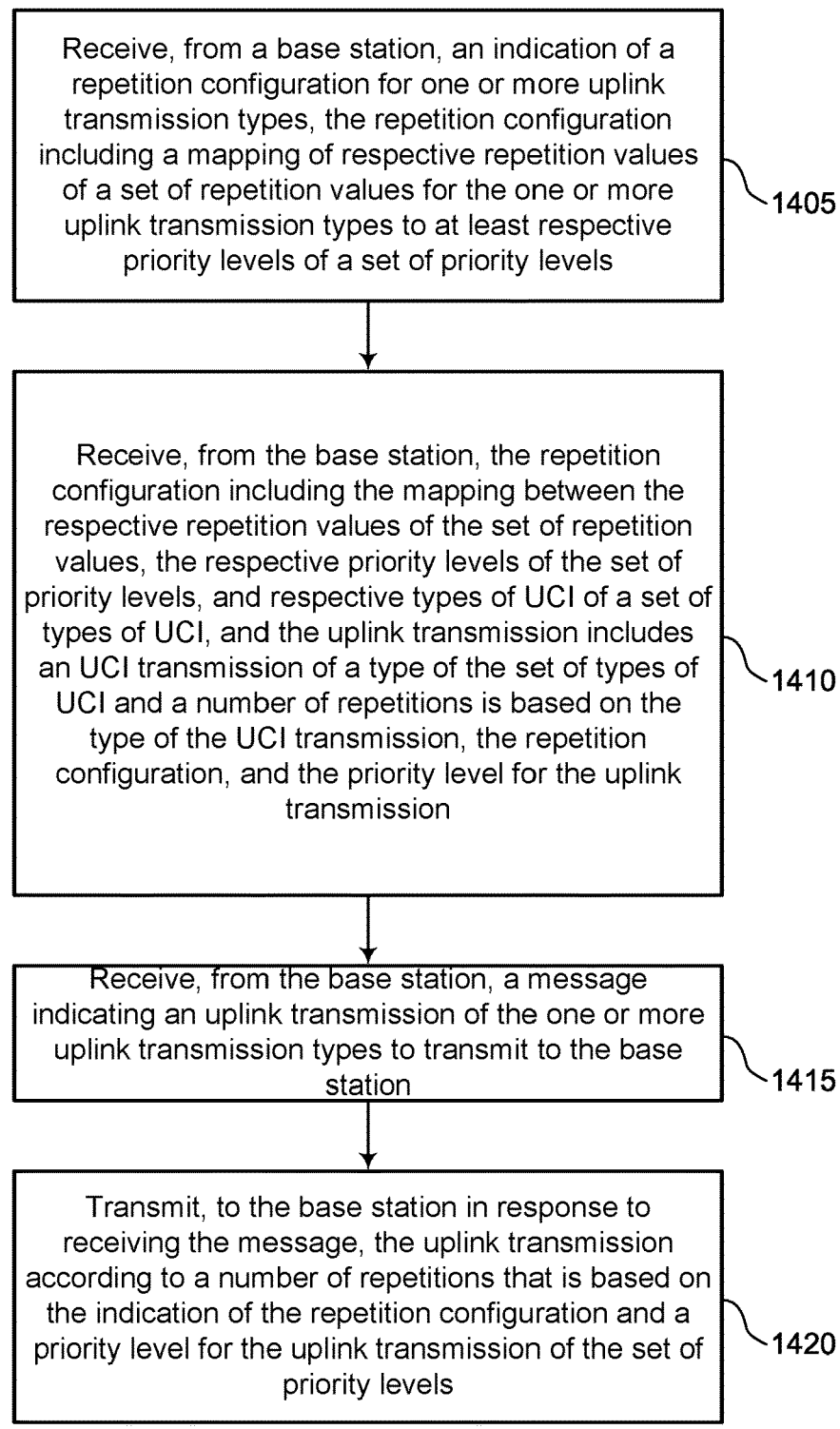

FIG. 14 shows a flowchart illustrating a method that supports uplink transmission repetition based on uplink priority in accordance with aspects of the present disclosure. The operations of the method may be implemented by a UE or its components. For example, the operations of the method may be performed by a UE 115 as described with reference to FIGS. 1-7. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an indication of a repetition configuration for one or more uplink transmission types, the repetition configuration including a mapping of respective repetition values of a set of multiple repetition values for the one or more uplink transmission types to at least respective priority levels of a set of multiple priority levels. The operations of 1405 may be performed in accordance with examples as disclosed herein. In some examples, aspects of the operations of 1405 may be performed by a repetition configuration indication component 625 as described with reference to FIG. 6.

At 1410, the method may include receiving, from the base station, the repetition configuration including the mapping between the respective repetition values of the set of multiple repetition values, the respective priority levels of the set of multiple priority levels, and respective types of UCI of a set of multiple types of UCI, and the uplink transmission includes an UCI transmission of a type of the set of multiple types of UCI and a number of repetitions is based on the type of the UCI transmission, the repetition configuration, and the priority level for the uplink transmission. The operations of 1410 may be performed in accordance with examples as disclosed herein. In some examples, aspects of the operations of 1410 may be performed by a UCI-based repetition component 645 as described with reference to FIG. 6.

At 1415, the method may include receiving, from the base station, a message indicating an uplink transmission of the one or more uplink transmission types to transmit to the base station. The operations of 1415 may be performed in accordance with examples as disclosed herein. In some examples, aspects of the operations of 1415 may be performed by an uplink transmission message component 630 as described with reference to FIG. 6.

At 1420, the method may include transmitting, to the base station in response to receiving the message, the uplink transmission according to the number of repetitions, the number of repetitions determined based on the indication of the repetition configuration and a priority level for the uplink transmission of the set of multiple priority levels. The operations of 1420 may be performed in accordance with examples as disclosed herein. In some examples, aspects of the operations of 1420 may be performed by an uplink transmission repetition component 635 as described with reference to FIG. 6.

Figure 15:
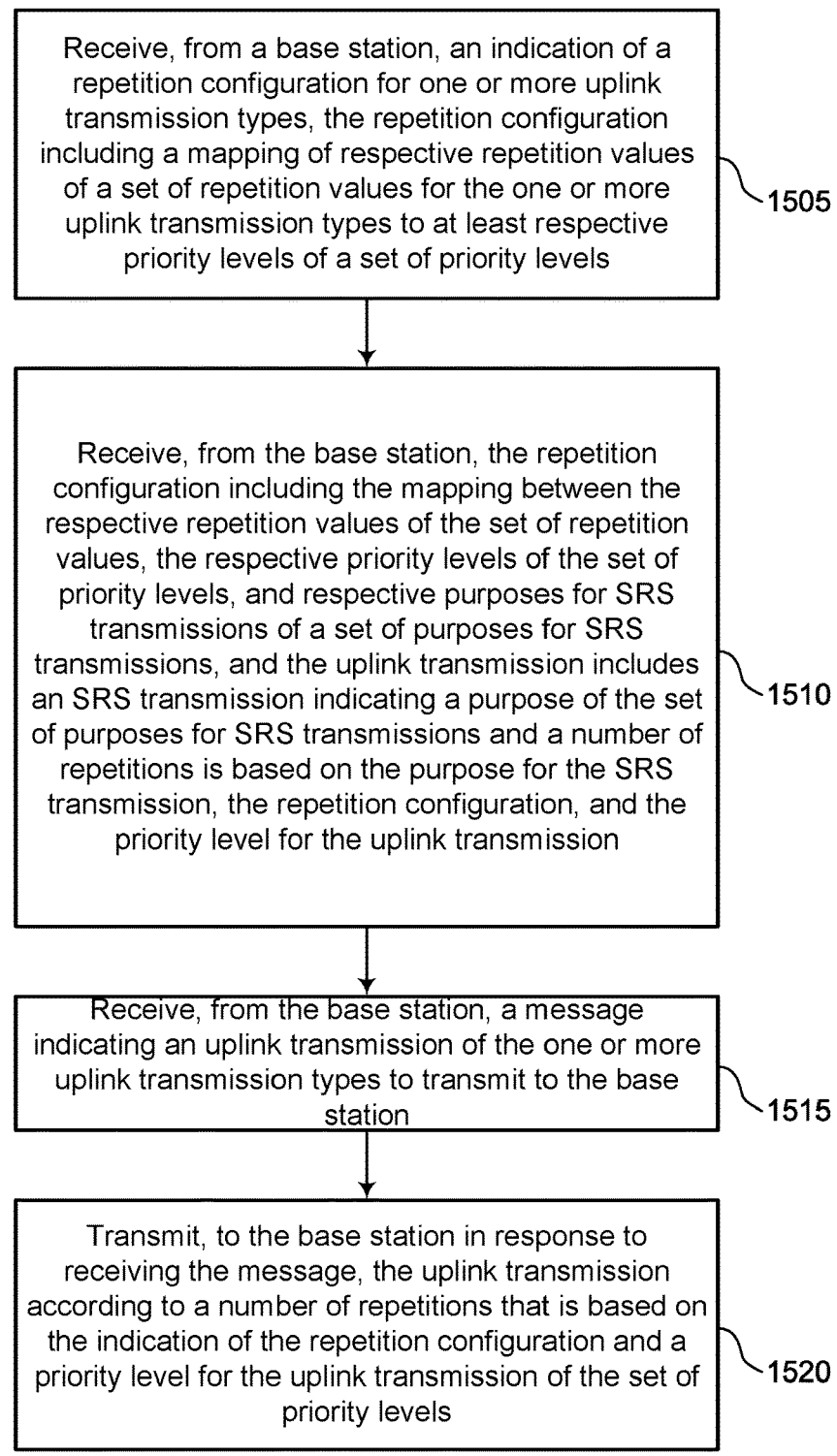

FIG. 15 shows a flowchart illustrating a method that supports uplink transmission repetition based on uplink priority in accordance with aspects of the present disclosure. The operations of the method may be implemented by a UE or its components. For example, the operations of the method may be performed by a UE 115 as described with reference to FIGS. 1-7. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, an indication of a repetition configuration for one or more uplink transmission types, the repetition configuration including a mapping of respective repetition values of a set of multiple repetition values for the one or more uplink transmission types to at least respective priority levels of a set of multiple priority levels. The operations of 1505 may be performed in accordance with examples as disclosed herein. In some examples, aspects of the operations of 1505 may be performed by a repetition configuration indication component 625 as described with reference to FIG. 6.

At 1510, the method may include receiving, from the base station, the repetition configuration including the mapping between the respective repetition values of the set of multiple repetition values, the respective priority levels of the set of multiple priority levels, and respective purposes for SRS transmissions of a set of multiple purposes for SRS transmissions, and the uplink transmission includes a SRS transmission indicating a purpose of the set of multiple purposes for SRS transmissions and a number of repetitions is based on the purpose for the SRS transmission, the repetition configuration, and the priority level for the uplink transmission. The operations of 1510 may be performed in accordance with examples as disclosed herein. In some examples, aspects of the operations of 1510 may be performed by an SRS-based repetition component 650 as described with reference to FIG. 6.

At 1515, the method may include receiving, from the base station, a message indicating an uplink transmission of the one or more uplink transmission types to transmit to the base station. The operations of 1515 may be performed in accordance with examples as disclosed herein. In some examples, aspects of the operations of 1515 may be performed by an uplink transmission message component 630 as described with reference to FIG. 6.

At 1520, the method may include transmitting, to the base station in response to receiving the message, the uplink transmission according to the number of repetitions, the number of repetitions determined based on the indication of the repetition configuration and a priority level for the uplink transmission of the set of multiple priority levels. The operations of 1520 may be performed in accordance with examples as disclosed herein. In some examples, aspects of the operations of 1520 may be performed by an uplink transmission repetition component 635 as described with reference to FIG. 6.

Figure 16:
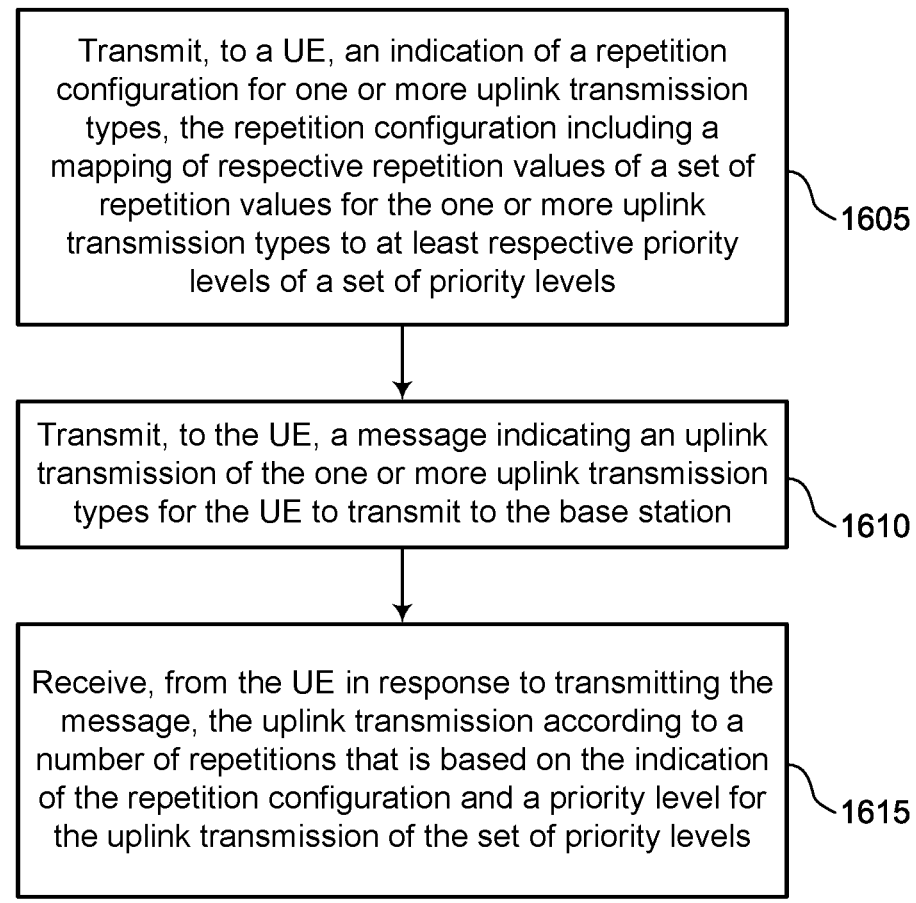

FIG. 16 shows a flowchart illustrating a method that supports uplink transmission repetition based on uplink priority in accordance with aspects of the present disclosure. The operations of the method may be implemented by a base station or its components. For example, the operations of the method may be performed by a base station 105 as described with reference to FIGS. 1-3 and 8-11. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, an indication of a repetition configuration for one or more uplink transmission types, the repetition configuration including a mapping of respective repetition values of a set of multiple repetition values for the one or more uplink transmission types to at least respective priority levels of a set of multiple priority levels. The operations of 1605 may be performed in accordance with examples as disclosed herein. In some examples, aspects of the operations of 1605 may be performed by a repetition configuration indicator 1025 as described with reference to FIG. 10.

At 1610, the method may include transmitting, to the UE, a message indicating an uplink transmission of the one or more uplink transmission types for the UE to transmit to the base station. The operations of 1610 may be performed in accordance with examples as disclosed herein. In some examples, aspects of the operations of 1610 may be performed by an uplink transmission message component 1030 as described with reference to FIG. 10.

At 1615, the method may include receiving, from the UE in response to transmitting the message, the uplink transmission according to a number of repetitions that is based on the indication of the repetition configuration and a priority level for the uplink transmission of the set of multiple priority levels. The operations of 1615 may be performed in accordance with examples as disclosed herein. In some examples, aspects of the operations of 1615 may be performed by an uplink transmission repetition component 1035 as described with reference to FIG. 10.

Figure 17:
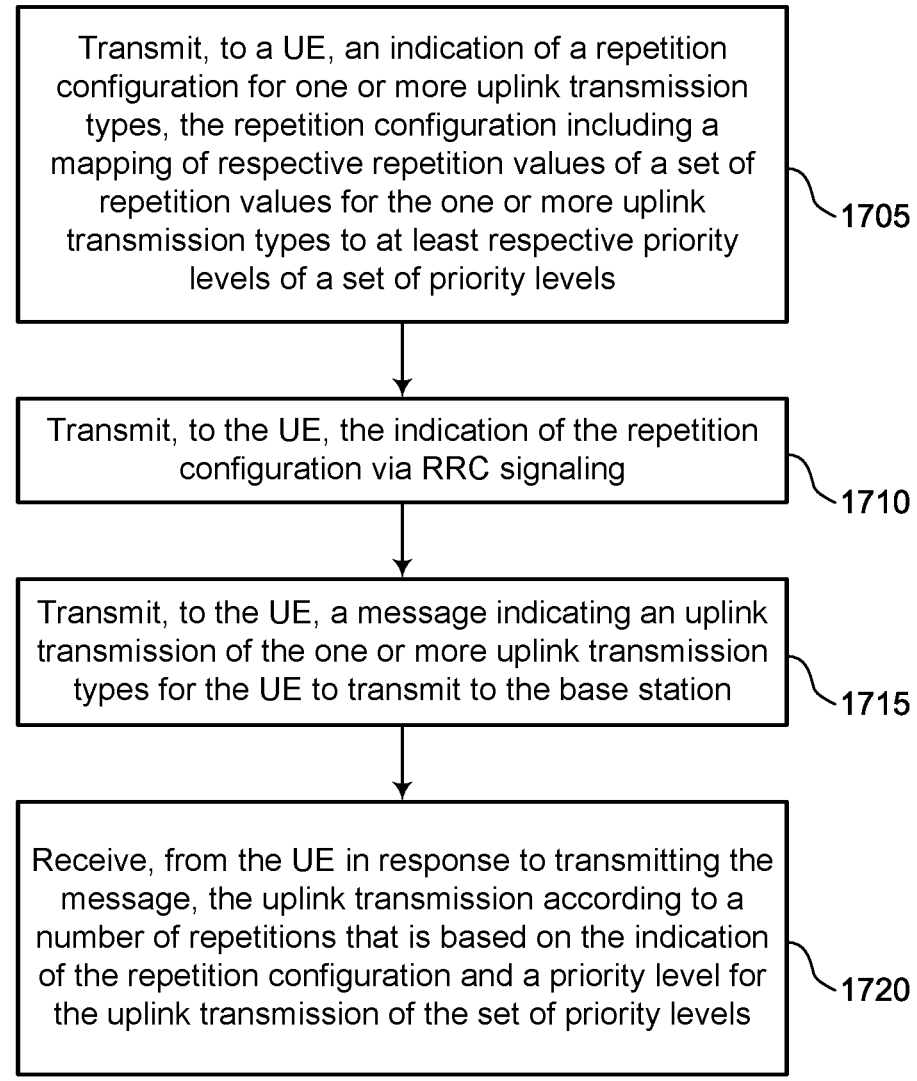

FIG. 17 shows a flowchart illustrating a method that supports uplink transmission repetition based on uplink priority in accordance with aspects of the present disclosure. The operations of the method may be implemented by a base station or its components. For example, the operations of the method may be performed by a base station 105 as described with reference to FIGS. 1-3 and 8-11. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, an indication of a repetition configuration for one or more uplink transmission types, the repetition configuration including a mapping of respective repetition values of a set of multiple repetition values for the one or more uplink transmission types to at least respective priority levels of a set of multiple priority levels. The operations of 1705 may be performed in accordance with examples as disclosed herein. In some examples, aspects of the operations of 1705 may be performed by a repetition configuration indicator 1025 as described with reference to FIG. 10.

At 1710, the method may include transmitting, to the UE, the indication of the repetition configuration via RRC signaling. The operations of 1710 may be performed in accordance with examples as disclosed herein. In some examples, aspects of the operations of 1710 may be performed by a repetition configuration indicator 1025 as described with reference to FIG. 10.

At 1715, the method may include transmitting, to the UE, a message indicating an uplink transmission of the one or more uplink transmission types for the UE to transmit to the base station. The operations of 1715 may be performed in accordance with examples as disclosed herein. In some examples, aspects of the operations of 1715 may be performed by an uplink transmission message component 1030 as described with reference to FIG. 10.

At 1720, the method may include receiving, from the UE in response to transmitting the message, the uplink transmission according to a number of repetitions that is based on the indication of the repetition configuration and a priority level for the uplink transmission of the set of multiple priority levels. The operations of 1720 may be performed in accordance with examples as disclosed herein. In some examples, aspects of the operations of 1720 may be performed by an uplink transmission repetition component 1035 as described with reference to FIG. 10.

Figure 18:
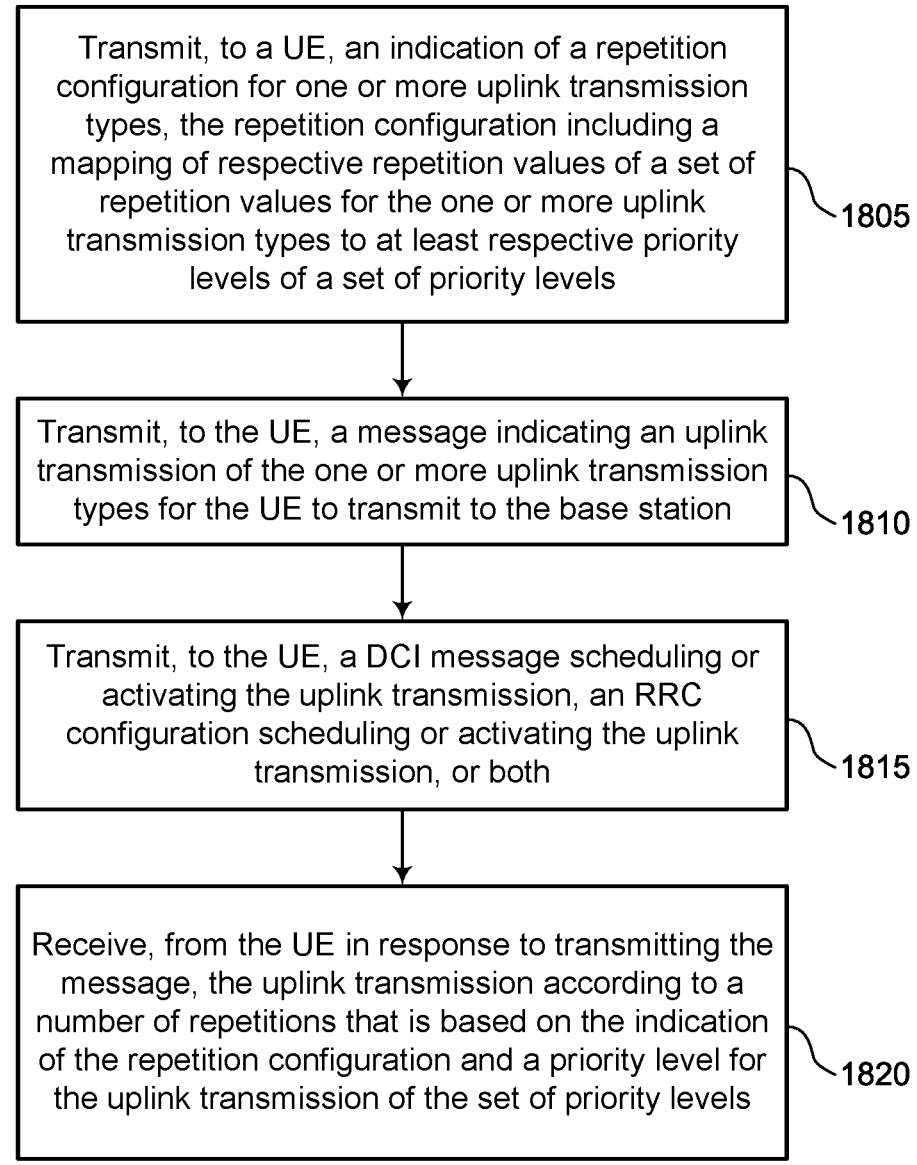

FIG. 18 shows a flowchart illustrating a method that supports uplink transmission repetition based on uplink priority in accordance with aspects of the present disclosure. The operations of the method may be implemented by a base station or its components. For example, the operations of the method may be performed by a base station 105 as described with reference to FIGS. 1-3 and 8-11. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, an indication of a repetition configuration for one or more uplink transmission types, the repetition configuration including a mapping of respective repetition values of a set of multiple repetition values for the one or more uplink transmission types to at least respective priority levels of a set of multiple priority levels. The operations of 1805 may be performed in accordance with examples as disclosed herein. In some examples, aspects of the operations of 1805 may be performed by a repetition configuration indicator 1025 as described with reference to FIG. 10.

At 1810, the method may include transmitting, to the UE, a message indicating an uplink transmission of the one or more uplink transmission types for the UE to transmit to the base station. The operations of 1810 may be performed in accordance with examples as disclosed herein. In some examples, aspects of the operations of 1810 may be performed by an uplink transmission message component 1030 as described with reference to FIG. 10.

At 1815, the method may include transmitting, to the UE, a DCI message scheduling or activating the uplink transmission, a RRC configuration scheduling or activating the uplink transmission, or both. The operations of 1815 may be performed in accordance with examples as disclosed herein. In some examples, aspects of the operations of 1815 may be performed by an uplink transmission message component 1030 as described with reference to FIG. 10.

At 1820, the method may include receiving, from the UE in response to transmitting the message, the uplink transmission according to a number of repetitions that is based on the indication of the repetition configuration and a priority level for the uplink transmission of the set of multiple priority levels. The operations of 1820 may be performed in accordance with examples as disclosed herein. In some examples, aspects of the operations of 1820 may be performed by an uplink transmission repetition component 1035 as described with reference to FIG. 10.

The following provides an overview of aspects of the present disclosure:

Aspect 1: A method for wireless communications at a UE, comprising: receiving, from a base station, an indication of a repetition configuration for one or more uplink transmission types, the repetition configuration comprising a mapping of respective repetition values of a plurality of repetition values for the one or more uplink transmission types to at least respective priority levels of a plurality of priority levels; receiving, from the base station, a message indicating an uplink transmission of the one or more uplink transmission types to transmit to the base station; and transmitting, to the base station in response to receiving the message, the uplink transmission according to a number of repetitions that is based at least in part on the indication of the repetition configuration and a priority level for the uplink transmission of the plurality of priority levels.

Aspect 2: The method of aspect 1, wherein receiving the indication of the repetition configuration comprises receiving the repetition configuration that comprises the mapping, wherein the number of repetitions is based at least in part on the priority level for the uplink transmission and the repetition configuration.

Aspect 3: The method of any of aspects 1 through 2, wherein the message indicating the uplink transmission comprises a priority indication indicating the priority level for the uplink transmission of the plurality of priority levels, and wherein the method further comprises determining the number of repetitions based at least in part on the priority indication and the indication of the repetition configuration.

Aspect 4: The method of any of aspects 1 through 3, wherein receiving the indication of the repetition configuration comprises receiving, from the base station, the repetition configuration comprising the mapping between the respective repetition values of the plurality of repetition values, the respective priority levels of the plurality of priority levels, and respective types of uplink control information of a plurality of types of uplink control information, wherein the uplink transmission comprises an uplink control information transmission of a type of the plurality of types of uplink control information and the number of repetitions is based at least in part on the type of the uplink control information transmission, the repetition configuration, and the priority level for the uplink transmission.

Aspect 5: The method of aspect 4, wherein each type of the plurality of types of uplink control information is mapped to multiple repetition values of the plurality of repetition values based at least in part on the plurality of priority levels.

Aspect 6: The method of any of aspects 4 through 5, wherein the plurality of types of uplink control information comprises hybrid automatic repeat request acknowledgment feedback, scheduling requests, channel state information reports, or a combination thereof.

Aspect 7: The method of any of aspects 1 through 3, wherein receiving the indication of the repetition configuration comprises receiving, from the base station, the repetition configuration comprising the mapping between the respective repetition values of the plurality of repetition values, the respective priority levels of the plurality of priority levels, and respective purposes for sounding reference signal transmissions of a plurality of purposes for sounding reference signal transmissions, wherein the uplink transmission comprises a sounding reference signal transmission indicating a purpose of the plurality of purposes for sounding reference signal transmissions and the number of repetitions is based at least in part on the purpose for the sounding reference signal transmission, the repetition configuration, and the priority level for the uplink transmission.

Aspect 8: The method of aspect 7, wherein the plurality of purposes for sounding reference signal transmissions comprises an antenna switching purpose, a codebook-based transmission purpose, a non-codebook-based transmission purpose, a beam management purpose, or a combination thereof.

Aspect 9: The method of any of aspects 1 through 8, wherein receiving the indication of the repetition configuration comprises receiving, from the base station, the indication of the repetition configuration via radio resource control signaling.

Aspect 10: The method of any of aspects 1 through 9, wherein receiving the message indicating the uplink transmission comprises receiving, from the base station, a downlink control information message scheduling or activating the uplink transmission, a radio resource control configuration scheduling or activating the uplink transmission, or both.

Aspect 11: The method of any of aspects 1 through 10, wherein the one or more uplink transmission types comprise a physical uplink control channel transmission, a physical uplink shared channel transmission, a sounding reference signal transmission, a physical random access channel transmission, or a combination thereof.

Aspect 12: The method of any of aspects 1 through 11, wherein each of the one or more uplink transmission types are preconfigured with a corresponding priority level of the plurality of priority levels at the UE.

Aspect 13: A method for wireless communications at a base station, comprising: transmitting, to a UE, an indication of a repetition configuration for one or more uplink transmission types, the repetition configuration comprising a mapping of respective repetition values of a plurality of repetition values for the one or more uplink transmission types to at least respective priority levels of a plurality of priority levels; transmitting, to the UE, a message indicating an uplink transmission of the one or more uplink transmission types for the UE to transmit to the base station; and receiving, from the UE in response to transmitting the message, the uplink transmission according to a number of repetitions that is based at least in part on the indication of the repetition configuration and a priority level for the uplink transmission of the plurality of priority levels.

Aspect 14: The method of aspect 13, wherein transmitting the indication of the repetition configuration comprises transmitting the repetition configuration that comprises the mapping, wherein the number of repetitions is based at least in part on the priority level for the uplink transmission and the repetition configuration.

Aspect 15: The method of any of aspects 13 through 14, wherein the message indicating the uplink transmission comprises a priority indication indicating the priority level for the uplink transmission of the plurality of priority levels, and wherein the method further comprises determining the number of repetitions based at least in part on the priority indication and the indication of the repetition configuration.

Aspect 16: The method of any of aspects 13 through 15, wherein transmitting the indication of the repetition configuration comprises transmitting, to the UE, the repetition configuration comprising the mapping between the respective repetition values of the plurality of repetition values, the respective priority levels of the plurality of priority levels, and respective types of uplink control information of a plurality of types of uplink control information, wherein the uplink transmission comprises an uplink control information transmission of a type of the plurality of types of uplink control information and the number of repetitions is based at least in part on the type of the uplink control information transmission, the repetition configuration, and the priority level for the uplink transmission.

Aspect 17: The method of aspect 16, wherein each type of the plurality of types of uplink control information is mapped to multiple repetition values of the plurality of repetition values based at least in part on the plurality of priority levels.

Aspect 18: The method of any of aspects 16 through 17, wherein the plurality of types of uplink control information comprises hybrid automatic repeat request acknowledgment feedback, scheduling requests, channel state information reports, or a combination thereof.

Aspect 19: The method of any of aspects 13 through 15, wherein transmitting the indication of the repetition configuration comprises transmitting, to the UE, the repetition configuration comprising the mapping between the respective repetition values of the plurality of repetition values, the respective priority levels of the plurality of priority levels, and respective purposes for sounding reference signal transmissions of a plurality of purposes for sounding reference signal transmissions, wherein the uplink transmission comprises a sounding reference signal transmission indicating a purpose of the plurality of purposes for sounding reference signal transmissions and the number of repetitions is based at least in part on the purpose for the sounding reference signal transmission, the repetition configuration, and the priority level for the uplink transmission.

Aspect 20: The method of aspect 19, wherein the plurality of purposes for sounding reference signal transmissions comprises an antenna switching purpose, a codebook-based transmission purpose, a non-codebook-based transmission purpose, a beam management purpose, or a combination thereof.

Aspect 21: The method of any of aspects 13 through 20, wherein transmitting the indication of the repetition configuration comprises transmitting, to the UE, the indication of the repetition configuration via radio resource control signaling.

Aspect 22: The method of any of aspects 13 through 21, wherein transmitting the message indicating the uplink transmission comprises transmitting, to the UE, a downlink control information message scheduling or activating the uplink transmission, a radio resource control configuration scheduling or activating the uplink transmission, or both.

Aspect 23: The method of any of aspects 13 through 22, wherein the one or more uplink transmission types comprise a physical uplink control channel transmission, a physical uplink shared channel transmission, a sounding reference signal transmission, a physical random access channel transmission, or a combination thereof.

Aspect 24: An apparatus for wireless communications at a UE, comprising a processor; memory coupled with the processor; and instructions stored in the memory and executable by the processor to cause the apparatus to perform a method of any of aspects 1 through 12.

Aspect 25: An apparatus for wireless communications at a UE, comprising at least one means for performing a method of any of aspects 1 through 12.

Aspect 26: A non-transitory computer-readable medium storing code for wireless communications at a UE, the code comprising instructions executable by a processor to perform a method of any of aspects 1 through 12.

Aspect 27: An apparatus for wireless communications at a base station, comprising a processor; memory coupled with the processor; and instructions stored in the memory and executable by the processor to cause the apparatus to perform a method of any of aspects 13 through 23.

Aspect 28: An apparatus for wireless communications at a base station, comprising at least one means for performing a method of any of aspects 13 through 23.

Aspect 29: A non-transitory computer-readable medium storing code for wireless communications at a base station, the code comprising instructions executable by a processor to perform a method of any of aspects 13 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network entity, an indication of a repetition configuration for one or more uplink transmission types, the repetition configuration comprising a mapping of respective repetition values of a plurality of repetition values for the one or more uplink transmission types to at least respective priority levels of a plurality of priority levels;
   receiving, from the network entity, a message indicating an uplink transmission of the one or more uplink transmission types to transmit to the network entity; and
   transmitting, to the network entity in response to receiving the message, the uplink transmission according to a number of repetitions that is based at least in part on the indication of the repetition configuration and a priority level for the uplink transmission of the plurality of priority levels.

2. The method of claim 1, wherein receiving the indication of the repetition configuration comprises receiving the repetition configuration that comprises the mapping, wherein the number of repetitions is based at least in part on the priority level for the uplink transmission and the repetition configuration.

3. The method of claim 1, wherein the message indicating the uplink transmission comprises a priority indication indicating the priority level for the uplink transmission of the plurality of priority levels, and wherein the method further comprises determining the number of repetitions based at least in part on the priority indication and the indication of the repetition configuration.

4. The method of claim 1, wherein receiving the indication of the repetition configuration comprises receiving, from the network entity, the repetition configuration comprising the mapping between the respective repetition values of the plurality of repetition values, the respective priority levels of the plurality of priority levels, and respective types of uplink control information of a plurality of types of uplink control information, wherein the uplink transmission comprises an uplink control information transmission of a type of the plurality of types of uplink control information and the number of repetitions is based at least in part on the type of the uplink control information transmission, the repetition configuration, and the priority level for the uplink transmission.

5. The method of claim 4, wherein each type of the plurality of types of uplink control information is mapped to multiple repetition values of the plurality of repetition values based at least in part on the plurality of priority levels.

6. The method of claim 4, wherein the plurality of types of uplink control information comprises one or more of hybrid automatic repeat request acknowledgment feedback, scheduling requests, channel state information reports.

7. The method of claim 1, wherein receiving the indication of the repetition configuration comprises receiving, from the network entity, the repetition configuration comprising the mapping between the respective repetition values of the plurality of repetition values, the respective priority levels of the plurality of priority levels, and respective purposes for sounding reference signal transmissions of a plurality of purposes for sounding reference signal transmissions, wherein the uplink transmission comprises a sounding reference signal transmission indicating a purpose of the plurality of purposes for sounding reference signal transmissions and the number of repetitions is based at least in part on the purpose for the sounding reference signal transmission, the repetition configuration, and the priority level for the uplink transmission.

8. The method of claim 7, wherein the plurality of purposes for sounding reference signal transmissions comprises one or more of an antenna switching purpose, a codebook-based transmission purpose, a non-codebook-based transmission purpose, a beam management purpose.

9. The method of claim 1, wherein receiving the indication of the repetition configuration comprises receiving, from the network entity, the indication of the repetition configuration via radio resource control signaling.

10. The method of claim 1, wherein receiving the message indicating the uplink transmission comprises receiving, from the network entity, a downlink control information message scheduling or activating the uplink transmission, a radio resource control configuration scheduling or activating the uplink transmission, or both.

11. The method of claim 1, wherein the one or more uplink transmission types comprise one or more of a physical uplink control channel transmission, a physical uplink shared channel transmission, a sounding reference signal transmission, a physical random access channel transmission.

12. The method of claim 1, wherein each of the one or more uplink transmission types are preconfigured with a corresponding priority level of the plurality of priority levels at the UE.

13. A method for wireless communications at a network entity, comprising:
transmitting, to a user equipment (UE), an indication of a repetition configuration for one or more uplink transmission types, the repetition configuration comprising a mapping of respective repetition values of a plurality of repetition values for the one or more uplink transmission types to at least respective priority levels of a plurality of priority levels;
transmitting, to the UE, a message indicating an uplink transmission of the one or more uplink transmission types for the UE to transmit to the network entity; and
receiving, from the UE in response to transmitting the message, the uplink transmission according to a number of repetitions that is based at least in part on the indication of the repetition configuration and a priority level for the uplink transmission of the plurality of priority levels.

14. The method of claim 13, wherein transmitting the indication of the repetition configuration comprises transmitting the repetition configuration that comprises the mapping, wherein the number of repetitions is based at least in part on the priority level for the uplink transmission and the repetition configuration.

15. The method of claim 13, wherein the message indicating the uplink transmission comprises a priority indication indicating the priority level for the uplink transmission of the plurality of priority levels, and wherein the method further comprises determining the number of repetitions based at least in part on the priority indication and the indication of the repetition configuration.

16. The method of claim 13, wherein transmitting the indication of the repetition configuration comprises transmitting, to the UE, the repetition configuration comprising the mapping between the respective repetition values of the plurality of repetition values, the respective priority levels of the plurality of priority levels, and respective types of uplink control information of a plurality of types of uplink control information, wherein the uplink transmission comprises an uplink control information transmission of a type of the plurality of types of uplink control information and the number of repetitions is based at least in part on the type of the uplink control information transmission, the repetition configuration, and the priority level for the uplink transmission.

17. The method of claim 16, wherein each type of the plurality of types of uplink control information is mapped to multiple repetition values of the plurality of repetition values based at least in part on the plurality of priority levels.

18. The method of claim 16, wherein the plurality of types of uplink control information comprises one or more of hybrid automatic repeat request acknowledgment feedback, scheduling requests, channel state information reports.

19. The method of claim 13, wherein transmitting the indication of the repetition configuration comprises transmitting, to the UE, the repetition configuration comprising the mapping between the respective repetition values of the plurality of repetition values, the respective priority levels of the plurality of priority levels, and respective purposes for sounding reference signal transmissions of a plurality of purposes for sounding reference signal transmissions, wherein the uplink transmission comprises a sounding reference signal transmission indicating a purpose of the plurality of purposes for sounding reference signal transmissions and the number of repetitions is based at least in part on the purpose for the sounding reference signal transmission, the repetition configuration, and the priority level for the uplink transmission.

20. The method of claim 19, wherein the plurality of purposes for sounding reference signal transmissions comprises one or more of an antenna switching purpose, a codebook-based transmission purpose, a non-codebook-based transmission purpose, a beam management purpose.

21. The method of claim 13, wherein transmitting the indication of the repetition configuration comprises transmitting, to the UE, the indication of the repetition configuration via radio resource control signaling.

22. The method of claim 13, wherein transmitting the message indicating the uplink transmission comprises transmitting, to the UE, a downlink control information message scheduling or activating the uplink transmission, a radio resource control configuration scheduling or activating the uplink transmission, or both.

23. The method of claim 13, wherein the one or more uplink transmission types comprise one or more of a physical uplink control channel transmission, a physical uplink shared channel transmission, a sounding reference signal transmission, a physical random access channel transmission.

24. An apparatus for wireless communications at a user equipment (UE), comprising:
a processor;
memory coupled with the processor; and
instructions stored in the memory and executable by the processor to cause the apparatus to:
receive, from a network entity, an indication of a repetition configuration for one or more uplink transmission types, the repetition configuration comprising a mapping of respective repetition values of a plurality of repetition values for the one or more uplink transmission types to at least respective priority levels of a plurality of priority levels;
receive, from the network entity, a message indicating an uplink transmission of the one or more uplink transmission types to transmit to the network entity; and
transmit, to the network entity in response to receiving the message, the uplink transmission according to a number of repetitions that is based at least in part on the indication of the repetition configuration and a priority level for the uplink transmission of the plurality of priority levels.

25. The apparatus of claim 24, wherein the instructions to receive the indication of the repetition configuration are executable by the processor to cause the apparatus to receive the repetition configuration that comprises the mapping, wherein the number of repetitions is based at least in part on the priority level for the uplink transmission and the repetition configuration.

26. The apparatus of claim 24, wherein the instructions to receive the indication of the repetition configuration are executable by the processor to cause the apparatus to receive, from the network entity, the repetition configuration comprising the mapping between the respective repetition values of the plurality of repetition values, the respective priority levels of the plurality of priority levels, and respective types of uplink control information of a plurality of types of uplink control information, wherein the uplink transmission comprises an uplink control information transmission of a type of the plurality of types of uplink control information and the number of repetitions is based at least in part on the type of the uplink control information transmission, the repetition configuration, and the priority level for the uplink transmission.

27. The apparatus of claim 24, wherein the instructions to receive the indication of the repetition configuration are executable by the processor to cause the apparatus to receive, from the network entity, the repetition configuration comprising the mapping between the respective repetition values of the plurality of repetition values, the respective priority levels of the plurality of priority levels, and respective purposes for sounding reference signal transmissions of a plurality of purposes for sounding reference signal transmissions, wherein the uplink transmission comprises a sounding reference signal transmission indicating a purpose of the plurality of purposes for sounding reference signal transmissions and the number of repetitions is based at least in part on the purpose for the sounding reference signal transmission, the repetition configuration, and the priority level for the uplink transmission.

28. The apparatus of claim 24, wherein the instructions to receive the indication of the repetition configuration are executable by the processor to cause the apparatus to receive, from the network entity, the indication of the repetition configuration via radio resource control signaling.

29. The apparatus of claim 24, wherein the instructions to receive the message indicating the uplink transmission are executable by the processor to cause the apparatus to receive, from the network entity, a downlink control information message scheduling or activating the uplink transmission, a radio resource control configuration scheduling or activating the uplink transmission, or both.

30. An apparatus for wireless communications at a network entity, comprising:
   a processor;
   memory coupled with the processor; and
   instructions stored in the memory and executable by the processor to cause the apparatus to:
      transmit, to a user equipment (UE), an indication of a repetition configuration for one or more uplink transmission types, the repetition configuration comprising a mapping of respective repetition values of a plurality of repetition values for the one or more uplink transmission types to at least respective priority levels of a plurality of priority levels;
      transmit, to the UE, a message indicating an uplink transmission of the one or more uplink transmission types for the UE to transmit to the network entity; and
      receive, from the UE in response to transmitting the message, the uplink transmission according to a number of repetitions that is based at least in part on the indication of the repetition configuration and a priority level for the uplink transmission of the plurality of priority levels.

\* \* \* \* \*